United States Patent

Gauthier et al.

[19]

[11] Patent Number: 6,099,986
[45] Date of Patent: Aug. 8, 2000

[54] IN-SITU SHORT CIRCUIT PROTECTION SYSTEM AND METHOD FOR HIGH-ENERGY ELECTROCHEMICAL CELLS

[75] Inventors: Michel Gauthier, La Prairie, Canada; Michael K. Domroese, South St. Paul, Minn.; Joseph A. Hoffman, Minneapolis, Minn.; David D. Lindeman, Hudson, Wis.; Joseph-Robert-Gaétan Noël, St-Hubert, Canada; Vern E. Radewald, Austin, Tex.; Jean Rouillard, Saint-Luc, Canada; Roger Rouillard, Beloeil, Canada; Toshimi Shiota, St. Bruno, Canada; Jennifer L. Trice, Eagan, Minn.

[73] Assignees: 3M Innovative Properties Company, Saint Paul, Minn.; Hydro-Quebec, Montreal, Canada

[21] Appl. No.: 08/900,929

[22] Filed: Jul. 25, 1997

[51] Int. Cl.[7] .............................. H01M 6/50; H01M 10/50
[52] U.S. Cl. .................................. 429/120; 429/62; 429/7
[58] Field of Search .................... 429/7, 62, 120

[56] References Cited

U.S. PATENT DOCUMENTS

| | | | |
|---|---|---|---|
| 2,812,376 | 11/1957 | Yardney . | |
| 3,193,412 | 7/1965 | Salkind et al. . | |
| 3,390,014 | 6/1968 | Eisler . | |
| 3,578,506 | 5/1971 | Chassoux . | |
| 3,630,783 | 12/1971 | Przybyla | 136/107 |
| 3,786,466 | 1/1974 | Naito et al. . | |
| 3,793,501 | 2/1974 | Stonestrom . | |
| 3,899,355 | 8/1975 | Chiklis . | |
| 3,937,635 | 2/1976 | Mead et al. | 136/83 R |
| 4,028,479 | 6/1977 | Fanciullo et al. | 429/152 |
| 4,060,669 | 11/1977 | Fanciullo | 429/152 |
| 4,060,670 | 11/1977 | Tamminen | 429/154 |
| 4,080,728 | 3/1978 | Buckler | 29/623.4 |
| 4,091,186 | 5/1978 | Ott et al. . | |
| 4,098,965 | 7/1978 | Kinsman | 429/153 |
| 4,105,807 | 8/1978 | Arora | 427/126 |
| 4,137,627 | 2/1979 | Kinsman | 29/623.4 |
| 4,150,266 | 4/1979 | Patrichi . | |
| 4,152,825 | 5/1979 | Bruneau | 29/623.2 |
| 4,207,389 | 6/1980 | Gunther et al. | 429/164 |
| 4,209,479 | 6/1980 | Gunther et al. | 264/104 |
| 4,233,371 | 11/1980 | Dorrestijn | 429/152 |
| 4,238,721 | 12/1980 | DeLuca et al. . | |
| 4,241,152 | 12/1980 | Klink . | |
| 4,303,877 | 12/1981 | Meinhold . | |
| 4,321,435 | 3/1982 | Grieger et al. . | |
| 4,322,484 | 3/1982 | Sugalski . | |
| 4,342,978 | 8/1982 | Meister . | |
| 4,370,531 | 1/1983 | Tobin . | |

(List continued on next page.)

FOREIGN PATENT DOCUMENTS

| | | |
|---|---|---|
| 044 753 A1 | 1/1982 | European Pat. Off. . |
| 145 498 A2 | 6/1985 | European Pat. Off. . |
| 0 170 883 A1 | 2/1986 | European Pat. Off. . |

(List continued on next page.)

*Primary Examiner*—Maria Nuzzolillo
*Assistant Examiner*—Mark Ruthkosky
*Attorney, Agent, or Firm*—Altera Law Group LLC

[57] ABSTRACT

An in-situ thermal management system for an energy storage device. The energy storage device includes a plurality of energy storage cells each being coupled in parallel to common positive and negative connections. Each of the energy storage cells, in accordance with the cell's technology, dimensions, and thermal/electrical properties, is configured to have a ratio of energy content-to-contact surface area such that thermal energy produced by a short-circuit in a particular cell is conducted to a cell adjacent the particular cell so as to prevent the temperature of the particular cell from exceeding a breakdown temperature. In one embodiment, a fuse is coupled in series with each of a number of energy storage cells. The fuses are activated by a current spike capacitively produced by a cell upon occurrence of a short-circuit in the cell, thereby electrically isolating the short-circuited cell from the common positive and negative connections.

20 Claims, 17 Drawing Sheets

U.S. PATENT DOCUMENTS

| | | | |
|---|---|---|---|
| 4,383,013 | 5/1983 | Bindin et al. . | |
| 4,409,086 | 10/1983 | Haas et al. . | |
| 4,409,538 | 10/1983 | Tabata . | |
| 4,429,026 | 1/1984 | Bruder | 429/152 |
| 4,436,792 | 3/1984 | Tomino et al. . | |
| 4,477,545 | 10/1984 | Akridge et al. | 429/191 |
| 4,479,083 | 10/1984 | Sullivan . | |
| 4,490,707 | 12/1984 | O'Leary . | |
| 4,495,259 | 1/1985 | Uba . | |
| 4,507,857 | 4/1985 | Epstein et al. | 29/623.2 |
| 4,517,265 | 5/1985 | Belanger et al. . | |
| 4,518,665 | 5/1985 | Fujita et al. . | |
| 4,525,439 | 6/1985 | Simonton | 429/162 |
| 4,547,438 | 10/1985 | McArthur et al. | 429/82 |
| 4,571,468 | 2/1986 | Weldon . | |
| 4,654,278 | 3/1987 | McManis, III et al. . | |
| 4,664,993 | 5/1987 | Sturgis et al. | 429/178 |
| 4,670,703 | 6/1987 | Williams . | |
| 4,691,085 | 9/1987 | Swanson . | |
| 4,692,577 | 9/1987 | Swanson . | |
| 4,707,795 | 11/1987 | Alber et al. . | |
| 4,752,540 | 6/1988 | Chua et al. | 429/56 |
| 4,758,483 | 7/1988 | Armand et al. . | |
| 4,816,354 | 3/1989 | Tamminen | 429/162 |
| 4,824,746 | 4/1989 | Belanger et al. . | |
| 4,828,939 | 5/1989 | Turley et al. . | |
| 4,851,307 | 7/1989 | Armand et al. . | |
| 4,852,684 | 8/1989 | Packard . | |
| 4,883,726 | 11/1989 | Peled | 424/120 |
| 4,887,348 | 12/1989 | Tamminen | 29/623.2 |
| 4,897,917 | 2/1990 | Gauthier et al. . | |
| 4,911,993 | 3/1990 | Turley et al. | 429/27 |
| 4,913,259 | 4/1990 | Packard . | |
| 4,923,582 | 5/1990 | Abrahamson et al. . | |
| 4,927,717 | 5/1990 | Turley et al. | 429/27 |
| 4,961,043 | 10/1990 | Koenck . | |
| 4,967,136 | 10/1990 | Nofzinger . | |
| 4,971,531 | 11/1990 | Aikioniemi . | |
| 4,973,936 | 11/1990 | Dimpault-Darcy et al. . | |
| 4,997,732 | 3/1991 | Austin et al. | 429/153 |
| 5,008,161 | 4/1991 | Johnston | 429/7 |
| 5,057,385 | 10/1991 | Hope et al. . | |
| 5,066,555 | 11/1991 | Tamminen | 429/121 |
| 5,070,427 | 12/1991 | Bush | 361/104 |
| 5,070,787 | 12/1991 | Weldon et al. . | |
| 5,071,652 | 12/1991 | Jones et al. . | |
| 5,089,027 | 2/1992 | Rossoll et al. | 29/623.2 |
| 5,162,171 | 11/1992 | Jones . | |
| 5,180,641 | 1/1993 | Burns et al. . | |
| 5,197,889 | 3/1993 | Rizzo et al. . | |
| 5,199,239 | 4/1993 | Younger . | |
| 5,204,194 | 4/1993 | Miller | 429/7 |
| 5,227,259 | 7/1993 | Weaver et al. . | |
| 5,227,264 | 7/1993 | Duval et al. . | |
| 5,283,512 | 2/1994 | Stadnick et al. . | |
| 5,300,373 | 4/1994 | Shackle . | |
| 5,313,152 | 5/1994 | Wozniak et al. . | |
| 5,324,597 | 6/1994 | Leadbetter et al. . | |
| 5,337,042 | 8/1994 | Hormel et al. . | |
| 5,346,786 | 9/1994 | Hodgetts . | |
| 5,354,630 | 10/1994 | Earl et al. . | |
| 5,363,405 | 11/1994 | Hormel . | |
| 5,382,480 | 1/1995 | Molyneux . | |
| 5,384,212 | 1/1995 | Heiman et al. . | |
| 5,385,793 | 1/1995 | Tiedemann et al. . | |
| 5,393,617 | 2/1995 | Klein . | |
| 5,401,595 | 3/1995 | Kagawa et al. . | |
| 5,409,787 | 4/1995 | Blanyer et al. . | |
| 5,415,954 | 5/1995 | Gauthier et al. . | |
| 5,422,200 | 6/1995 | Hope et al. . | |
| 5,423,110 | 6/1995 | Gauthier et al. . | |
| 5,438,249 | 8/1995 | Chang et al. . | |
| 5,478,667 | 12/1995 | Shackle et al. . | |
| 5,478,668 | 12/1995 | Gozdz et al. . | |
| 5,479,083 | 12/1995 | Brainard . | |
| 5,487,958 | 1/1996 | Tura . | |
| 5,503,947 | 4/1996 | Kelly et al. . | |
| 5,503,948 | 4/1996 | MacKay et al. . | |
| 5,504,415 | 4/1996 | Podrazhansky et al. . | |
| 5,519,563 | 5/1996 | Higashijimaa et al. . | |
| 5,521,024 | 5/1996 | Sasaki et al. . | |
| 5,528,122 | 6/1996 | Sullivan et al. . | |
| 5,530,336 | 6/1996 | Eguchi et al. . | |
| 5,532,087 | 7/1996 | Nerz et al. . | |
| 5,547,775 | 8/1996 | Eguchi et al. . | |
| 5,547,780 | 8/1996 | Kagawa et al. . | |
| 5,548,200 | 8/1996 | Nor et al. . | |
| 5,552,243 | 9/1996 | Klein . | |
| 5,556,576 | 9/1996 | Kim . | |
| 5,561,380 | 10/1996 | Sway-Tin et al. . | |
| 5,563,002 | 10/1996 | Harshe . | |
| 5,567,539 | 10/1996 | Takahashi et al. . | |
| 5,568,039 | 10/1996 | Fernandez . | |
| 5,569,063 | 10/1996 | Morioka et al. . | |
| 5,569,550 | 10/1996 | Garrett et al. . | |
| 5,573,869 | 11/1996 | Hwang et al. . | |
| 5,582,931 | 12/1996 | Soichiro . | |
| 5,585,207 | 12/1996 | Wakabe et al. . | |
| 5,589,290 | 12/1996 | Klink et al. . | |
| 5,593,604 | 1/1997 | Beasly et al. . | |
| 5,594,320 | 1/1997 | Pacholok et al. . | |
| 5,595,835 | 1/1997 | Miyamoto et al. . | |
| 5,595,839 | 1/1997 | Hossain . | |
| 5,599,636 | 2/1997 | Braun . | |
| 5,600,230 | 2/1997 | Dunstan . | |
| 5,602,481 | 2/1997 | Fukuyama . | |
| 5,610,495 | 3/1997 | Yee et al. . | |
| 5,612,153 | 3/1997 | Moulton et al. . | |
| 5,618,641 | 4/1997 | Arias . | |
| 5,619,417 | 4/1997 | Kendall . | |
| 5,620,808 | 4/1997 | Wheeler et al. . | |
| 5,622,789 | 4/1997 | Young . | |
| 5,623,196 | 4/1997 | Fernandez et al. . | |
| 5,626,990 | 5/1997 | Miller et al. . | |
| 5,631,537 | 5/1997 | Armstrong . | |
| 5,633,573 | 5/1997 | van Phuoc et al. . | |
| 5,637,981 | 6/1997 | Nagai et al. . | |
| 5,643,044 | 7/1997 | Lund . | |
| 5,647,534 | 7/1997 | Kelz et al. . | |
| 5,648,713 | 7/1997 | Mangez . | |
| 5,650,240 | 7/1997 | Rogers . | |
| 5,652,498 | 7/1997 | Edye et al. . | |
| 5,652,502 | 7/1997 | van Phuoc et al. . | |
| 5,654,622 | 8/1997 | Toya et al. . | |
| 5,670,272 | 9/1997 | Cheu et al. | 429/162 |
| 5,824,432 | 10/1998 | Currle . | |

FOREIGN PATENT DOCUMENTS

| | | |
|---|---|---|
| 177 225 A1 | 4/1986 | European Pat. Off. . |
| 0 225 767 A2 | 6/1987 | European Pat. Off. . |
| 244 683 A1 | 11/1987 | European Pat. Off. . |
| 310 075 A2 | 4/1989 | European Pat. Off. . |
| 336 102 A2 | 10/1989 | European Pat. Off. . |
| 569 035 A1 | 11/1993 | European Pat. Off. . |
| 570 590 A1 | 11/1993 | European Pat. Off. . |
| 584 639 A1 | 3/1994 | European Pat. Off. . |
| 643 429 A2 | 3/1995 | European Pat. Off. . |
| 652 620 A1 | 5/1995 | European Pat. Off. . |
| 700 109 A1 | 3/1996 | European Pat. Off. . |
| 0 721 247 A2 | 7/1996 | European Pat. Off. . |
| 774 795 A2 | 5/1997 | European Pat. Off. . |
| 780 920 A1 | 6/1997 | European Pat. Off. . |

| | | | | | |
|---|---|---|---|---|---|
| 2 511 547 | 2/1983 | France . | 8-115711 | 5/1996 | Japan . |
| 2 721 407 | 12/1995 | France . | 9-017416 | 1/1997 | Japan . |
| 3246968 A1 | 7/1984 | Germany . | 1066-385 | 6/1986 | Russian Federation . |
| 4218381 C1 | 5/1993 | Germany . | 1582979 | 1/1981 | United Kingdom . |
| 42 25 746 A1 | 2/1994 | Germany . | 2 206 726 | 1/1989 | United Kingdom . |
| 19618897 A1 | 11/1997 | Germany . | 2 282 924 | 4/1995 | United Kingdom . |
| 59-091658 | 5/1984 | Japan . | 2295718 | 6/1996 | United Kingdom . |
| 59-117061 | 7/1984 | Japan . | WO 91/17451 | 11/1991 | WIPO . |
| 59-139555 | 8/1984 | Japan . | WO 92/02963 | 2/1992 | WIPO . |
| 61-099278 | 5/1986 | Japan . | WO 93/01624 | 1/1993 | WIPO . |
| 63-062156 | 3/1988 | Japan . | WO 94/14206 | 6/1994 | WIPO . |
| 1-320758 | 12/1989 | Japan . | WO 95/00978 | 1/1995 | WIPO . |
| 4-294071 | 10/1992 | Japan . | WO 95/26055 | 9/1995 | WIPO . |
| 5-166533 | 7/1993 | Japan . | WO 95/34824 | 12/1995 | WIPO . |
| 6-036756 | 2/1994 | Japan . | WO 96/17397 | 6/1996 | WIPO . |
| 6-203823 | 7/1994 | Japan . | WO 96/19816 | 6/1996 | WIPO . |
| 7-250788 | 10/1995 | Japan . | WO 96/22523 | 7/1996 | WIPO . |
| 7-282841 | 10/1995 | Japan . | WO 98/11620 | 3/1998 | WIPO . |

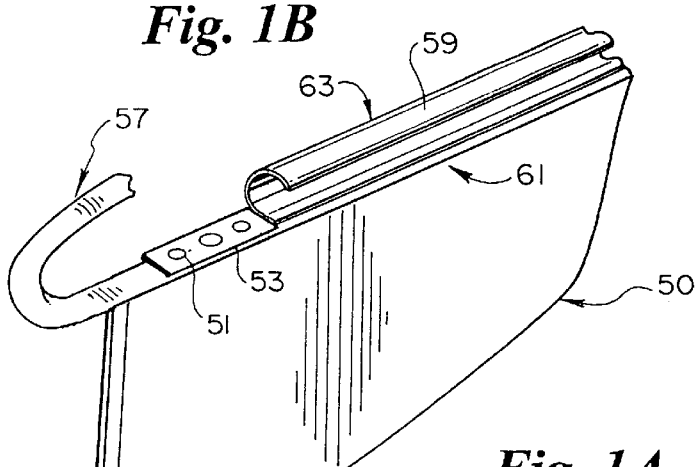
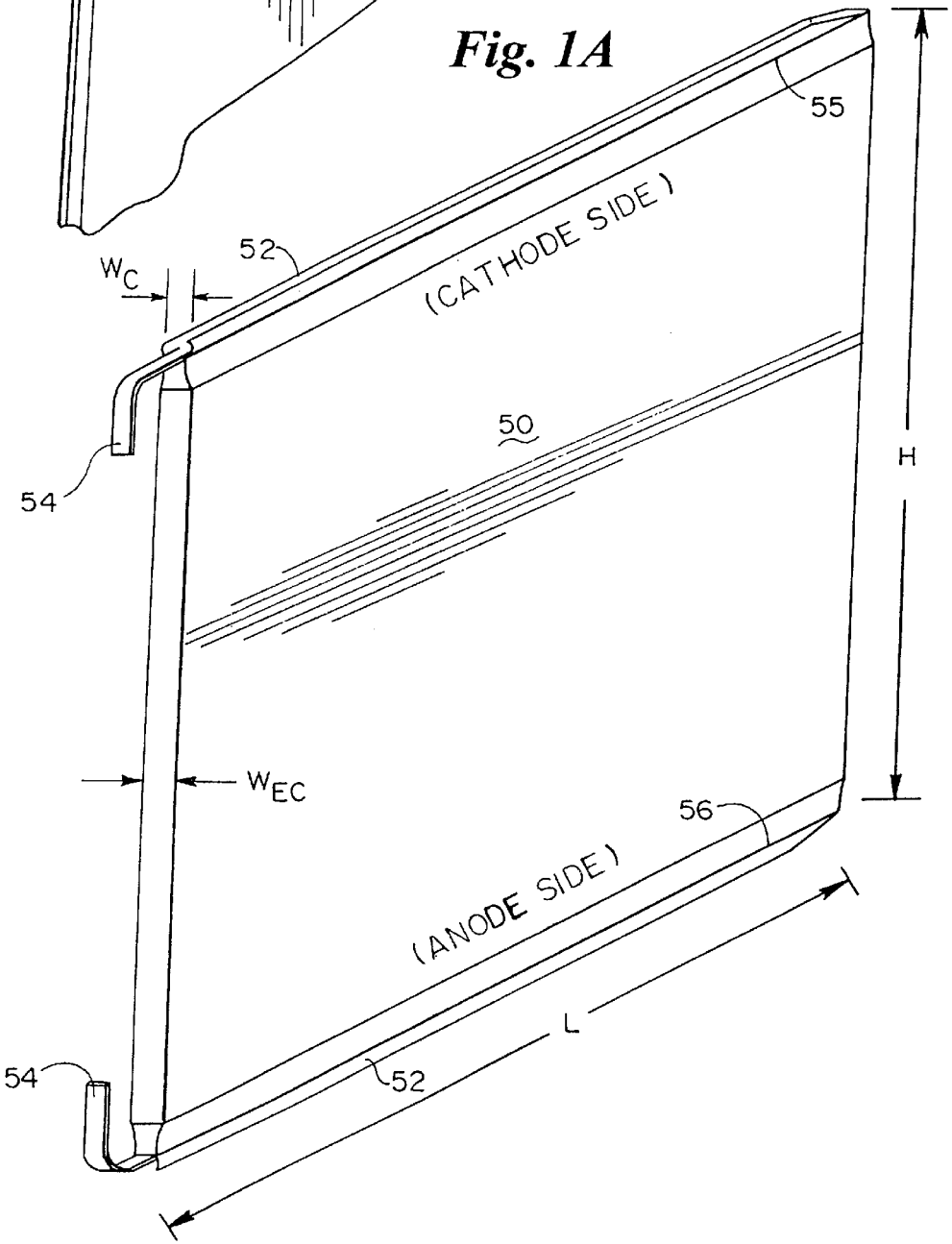

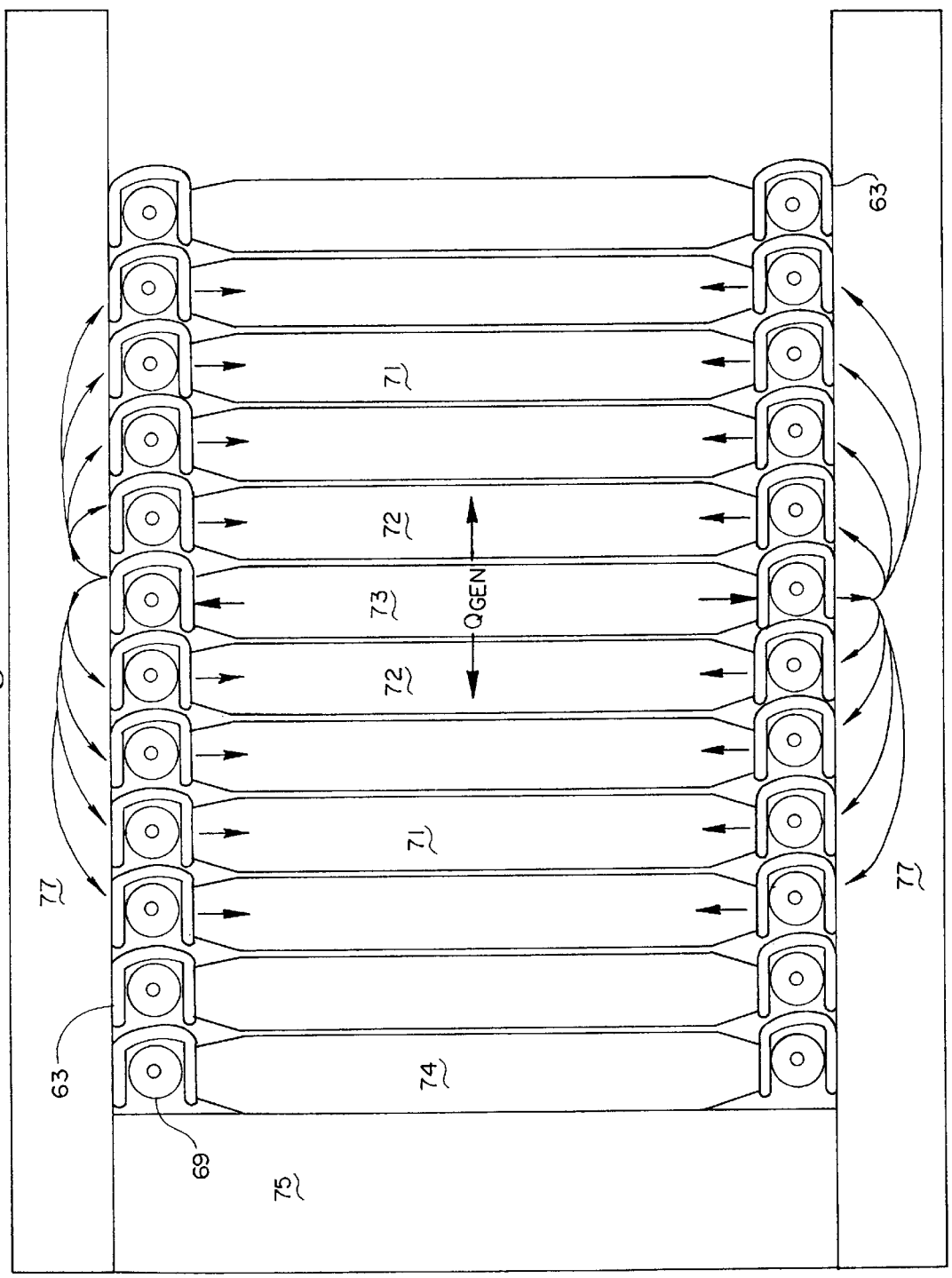

IN-SITU SHORT CIRCUIT PROTECTION SYSTEM AND METHOD FOR HIGH-ENERGY ELECTROCHEMICAL CELLS

GOVERNMENT LICENSE RIGHTS

The Government of the United States of America has rights in this invention pursuant to Cooperative Agreement No. DE-FC02-91CE50336 awarded by the U.S. Department of Energy.

FIELD OF THE INVENTION

This invention relates generally to energy storage devices, and more particularly, to an apparatus and method for protecting energy storage cells upon occurrence of a short-circuit condition.

BACKGROUND OF THE INVENTION

The demand for new and improved electronic and electromechanical systems has placed increased pressure on the manufacturers of energy storage devices to develop battery technologies that provide for high energy generation in a low-volume package. Conventional battery systems, such as those that utilize lead acid for example, are often unsuitable for use in high-power, low-weight applications. Other known battery technologies may be considered too unstable or hazardous for use in consumer product applications.

A number of advanced battery technologies have recently been developed, such as metal hydride (e.g., Ni-MH), lithium-ion, and lithium polymer cell technology, which would appear to provide the requisite level of energy production and safety margins for many commercial and consumer applications. Such advanced energy storage systems, however, typically produce a significant amount of heat which, if not properly dissipated, can result in a thermal runaway condition and eventual destruction of the cells, as well as the system being powered by the cells.

The thermal characteristics of an advanced battery cell must therefore be understood and appropriately considered when designing a battery system suitable for use in commercial and consumer devices and systems. A conventional approach of providing a heat transfer mechanism external to such a cell, for example, may be inadequate to effectively dissipate heat from internal portions of the cell. Such conventional approaches may also be too expensive or bulky in certain applications. The severity of consequences resulting from short-circuit and thermal run-away conditions increases significantly when advanced high-energy electrochemical cells are implicated.

There is a need in the advanced battery manufacturing industry for an energy storage system that exhibits high-energy output, and one that provides for safe and reliable use in a wide range of applications. There exists a further need for a non-intrusive, inexpensive thermal management approach that protects energy storage cells from thermal run-away resulting from a short-circuit condition. The present invention fulfills these and other needs.

SUMMARY OF THE INVENTION

The present invention is directed to an in-situ thermal management system for an energy storage device. The energy storage device includes a plurality of energy storage cells each being coupled in parallel to common positive and negative connections. Each of the energy storage cells, in accordance with the cell's technology, dimensions, and thermal/electrical properties, is configured to have a ratio of energy content-to-contact surface area such that thermal energy produced by a short-circuit in a particular cell is conducted to adjacent and neighboring cells so as to prevent the temperature of the particular cell from exceeding a breakdown temperature. In one embodiment, a fuse is coupled in series with each of a number of energy storage cells. The fuses are activated by a current spike capacitively produced by a cell upon occurrence of a short-circuit in the cell, thereby electrically isolating the short-circuited cell from the common positive and negative connections.

BRIEF DESCRIPTION OF THE DRAWINGS

FIGS. 1A–1B illustrate an embodiment of a solid-state, thin-film electrochemical cell having a prismatic configuration and including a thermal conductor in accordance with an embodiment of the present invention;

FIG. 1C is a partial illustration of an energy storing module containing a stack of thin-film electrochemical cells and employing an in-situ thermal management methodology in accordance with an embodiment of the present invention;

DETAILED DESCRIPTION OF THE EMBODIMENTS

Figure 2:
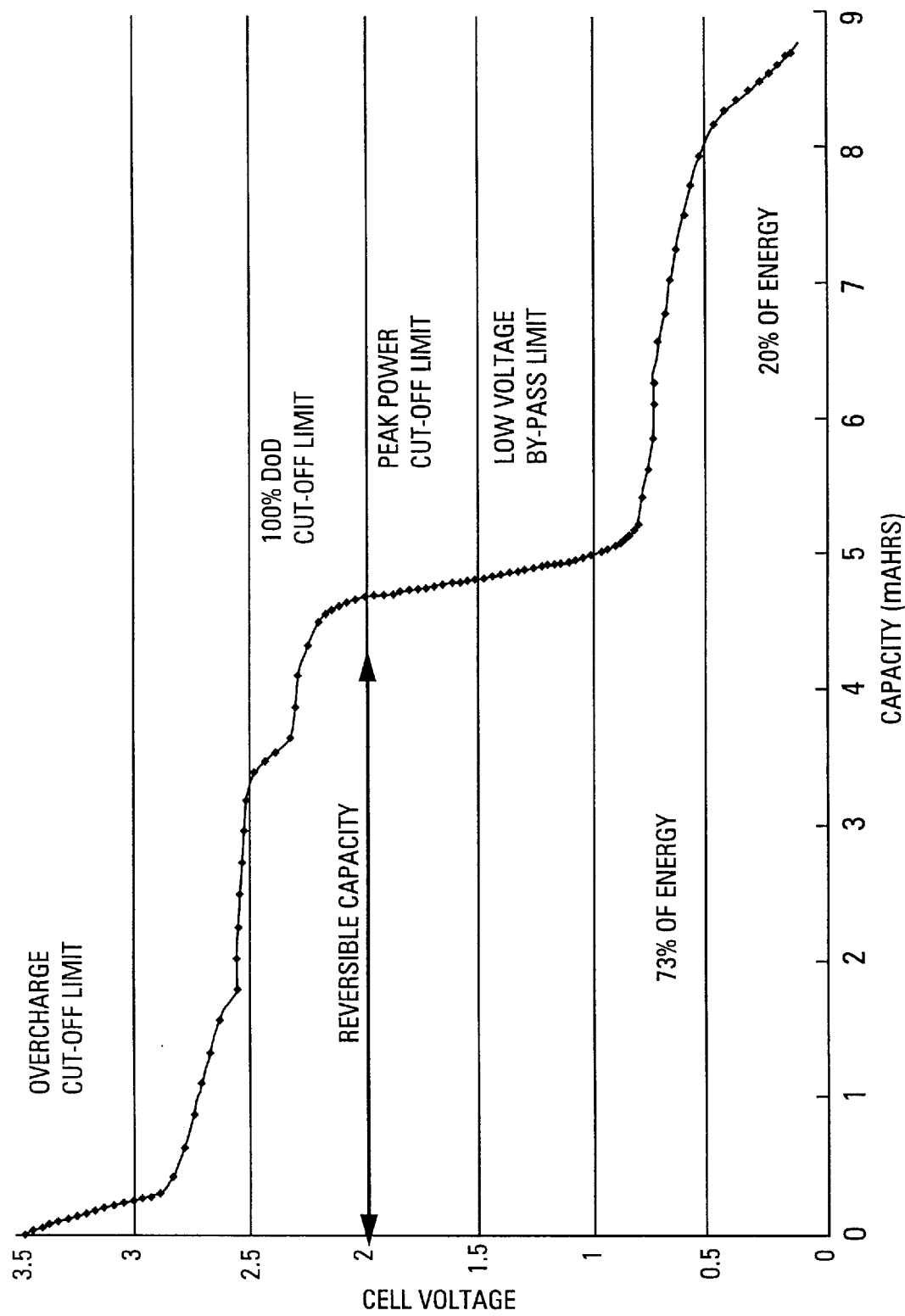
FIG. 2 is a graphical representation of a relationship between voltage and capacity for an electrochemical cell of the type illustrated in FIG. 1.

In accordance with one embodiment of an energy storage system that utilizes high-energy electrochemical cells, the system includes solid-state, thin-film cells of the type shown in FIG. 1. Such thin-film electrochemical cells are particularly well-suited for use in the construction of high-current, high-voltage energy storing modules and batteries, such as those used to power electric vehicles for example.

In FIG. 1A, there is shown an embodiment of a prismatic electrochemical cell 50 which includes an anode contact 56 and a cathode contact 55 formed respectively along opposing edges of the electrochemical cell 50. A thermal conductor 52 is spot welded or otherwise attached to each of the anode and cathode contacts 56, 55, respectively. The thermal conductor 52 is typically disposed along the length of the anode contact 56 and the cathode contact 55, and typically includes an electrical connection lead 54 for conducting current into and out of the electrochemical cell 50, the current being collected and conducted preferentially along the anode and cathode contacts 56, 55.

The embodiment of a thermal conductor 63 shown in FIG. 1B includes a copper tab 53 that extends along the length of a sprayed metal anode or cathode contact 61. The copper tab 53 includes a resilient member 59 through which heat is transferred between the cell 50 and an adjacently disposed heat sink, such as a wall of a metallic housing. The copper tab 53 is spot welded to the sprayed metal contact 61 at a number of weld locations 51. A flexible electrical lead 57 is ultrasonically welded to the end 63 of the copper tab 53. Current is conducted primarily along the sprayed metal contact 61 of the cell 50 and communicated to external connections via the flexible electrical leads 57.

As is shown in FIG. 1C, the thermal conductor 63 provides a thermal flux path for transferring thermal energy between the electrochemical cells and a thermally conductive, electrically resistive material or element. It is to be understood that a thermally conductive, electrically resistive material, element or structure as described herein refers to a surface coating/treatment or separate material that permits a sufficient amount of heat to be conducted therethrough, yet is electrically resistive to the flow of current relative to a current path provided for conducting current into and out of an electrochemical cell. An anodized coating, for example, may have a thickness that permits a sufficient amount of thermal energy to be conducted therethrough, yet is sufficiently resistive to electrical current relative to the anode and cathode contacts of the cell or the thermal conductor. By way of further example, a thermally conductive polymer element may be employed, with the density of thermally conductive particles impregnated therein being selected to provide a desired balance between thermal and electrical conductivity characteristics.

As is further shown in the multiple cell embodiment of FIG. 1C, the thermal conductors 63 also provide a thermal flux path for transferring heat between neighboring cells. If a short develops in a cell 73 within a stack of cells, for example, the excess heat, $Q_{gen}$, generated by the short-circuited cell 73 is conducted through the thermally conductive, electrically resistive material provided on the housing surface 77, and to adjacent cells 72 and non-adjacent neighboring cells 71 via the thermal conductors 63. The excess heat, $Q_{gen}$, is also conducted to adjacent cells 72 in physical contact with the short-circuited cell 73. A thermally conductive plate 75 serves as a heat sink for a cell 74 situated at the end of the cell stack.

Further, the thermal conductor 63 is configured so as to exhibit a spring-like character which provides for substantially continuous contact between a cell 73 and a structure, such as a metallic planar surface 77, disposed adjacent the cell 73 in response to relative movement between the cell 73 and the adjacent structure 77. A separate spring element, 69, such as a tubular elastomeric element, may be retained within the thermal conductor 63 to enhance the spring properties of the thermal conductor 63. The thermal conductor 63 may be fashioned from copper and have a substantially C-shaped, double C-shaped, Z-shaped, O-shaped, S-shaped, V-shaped, or finger-shaped cross-section. Other useful thermal conductors are disclosed in co-pending patent application Ser. No. 08/900,428 entitled "Thermal Conductor for High-Energy Electrochemical Cells" (Hoffman et al.), the contents of which are incorporated herein by reference.

In the embodiment shown in FIG. 1A, the electrochemical cell 50 is fabricated to have a length L of approximately 135 mm, a height H of approximately 149 mm, and a width $W_{ec}$ of approximately 5.4mm or approximately 5.86 mm when including a foam core element. The width $W_c$ of the cathode contact 55 and the anode contact 56 is approximately 3.72 mm, respectively. Such a cell 50 typically exhibits a nominal energy rating of approximately 36.5 Wh, a peak power rating of 87.0 W at 80 percent depth of discharge (DOD), and a cell capacity of 14.4 Ah at full charge. FIG. 2 illustrates in graphical form a relationship between voltage and capacity for an electrochemical cell having a construction substantially similar to that shown in FIG. 1A. It can be seen that an individual electrochemical cell has a nominal operating voltage ranging between approximately 2.0 V and 3.1 V.

Figure 3:
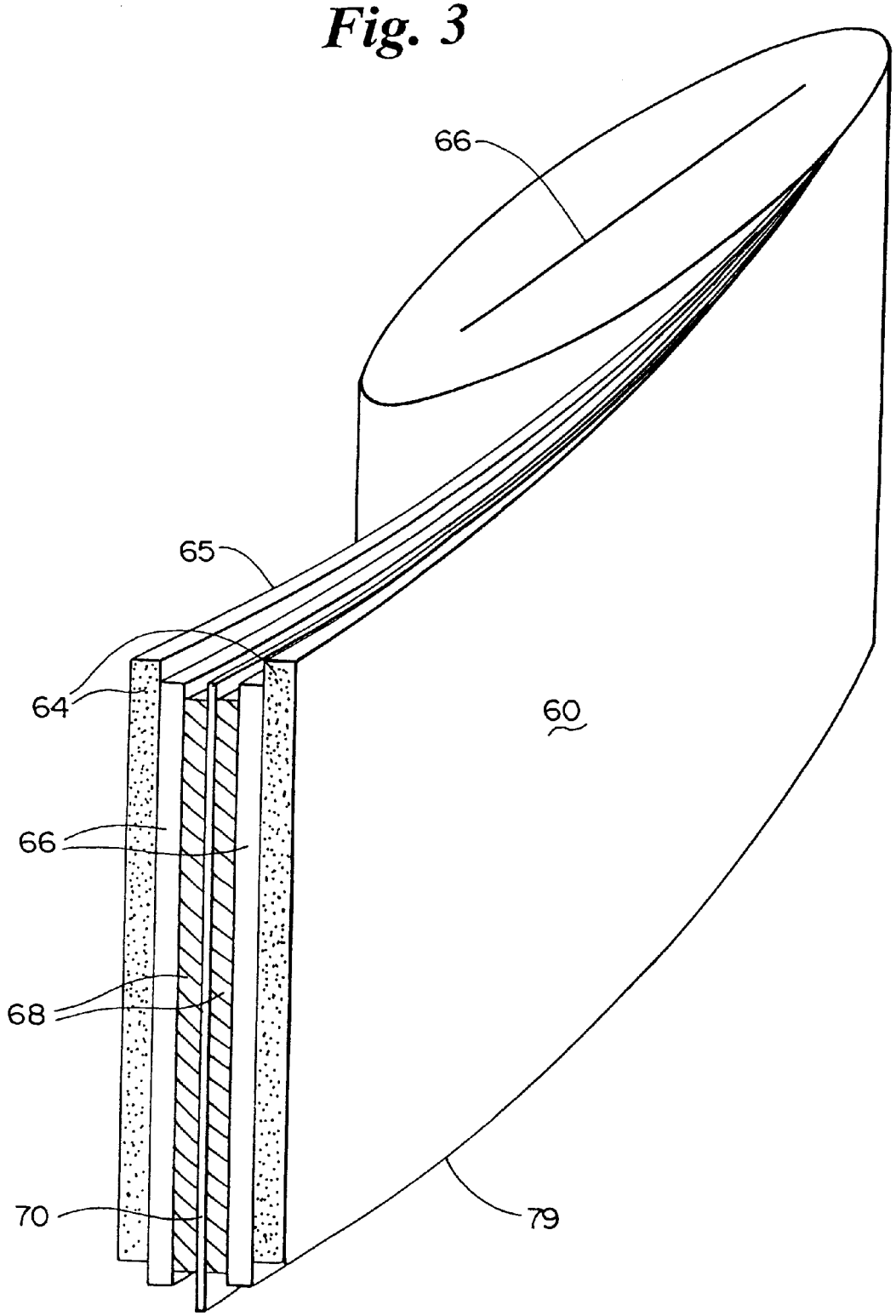
FIG. 3 is an illustration of various film layers constituting a thin-film electrochemical cell.

The electrochemical cells shown in FIGS. 1A–1C may have a construction similar to that illustrated in FIG. 3. In this embodiment, an electrochemical cell 60 is shown as having a flat wound prismatic configuration which incorporates a solid polymer electrolyte 66 constituting an ion transporting membrane, a lithium metal anode 64, a vanadium oxide cathode 68, and a cathode current collector 70. These film elements are fabricated to form a thin-film laminated prismatic structure, which may also include an insulation film, such as polypropylene film.

The cell shown in FIG. 3 includes a central cathode current collector 70 which is disposed between each of the two cathode films 68 to form a bi-face cell configuration. A mono-face cell configuration may alternatively be employed in which a single cathode collector 70 is associated with a single anode/electrolyte/cathode element combination. In this configuration, an insulating film is typically disposed between individual anode/electrolyte/cathode/collector element combinations.

A known sputtering metallization process is employed to form current collecting contacts along the edges 65, 79 of the anode and cathode current collecting films 64, 70, respectively. It is noted that the metal-sprayed contacts provide for superior current collection along the length of the anode and cathode film edges 65, 79, and demonstrate good electrical contact and heat transfer characteristics. The electrochemical cells illustrated in FIGS. 1A–1C and 3 may be fabricated in accordance with the methodologies disclosed in U.S. Pat. Nos. 5,423,110, 5,415,954, and 4,897,917.

In Table 1 below, various thermal properties are provided for an electrochemical cell having a construction similar to that illustrated in FIG. 1 and maintained at a temperature of approximately 60° C.

TABLE 1

| | Thermal Conductivity (W/m° C.) | | | |
|---|---|---|---|---|
| Section | Direction of the film thickness | Direction of the connectors | Density (kg/m$^3$) | Specific Heat (J/kg° C.) |
| Active Section | 0.4042 | 48.10 | 1356 | 1411 |
| Anode Side, Inactive Zone | 0.0466 | 28.90 | 252 | 2714 |
| Cathode Side, Inactive Side | 0.0388 | 18.45 | 441 | 1470 |
| Complete Cell | | | 1218 | 1435 |

| | Other Components | |
|---|---|---|
| Component | Thermal Conductivity (W/m° C.) | Density x specific heat (kJ/m$^{3°}$ C.) |
| Cell's core (foam) | 0.071 | 401.3 |
| Metallization | 366.7 | 3254.6 |
| Spring-type conductor | 134.5 | 3254.6 |
| Vessel wall - anodized | 178.8 | 2566.9 |

A number of electrochemical cells may be selectively interconnected in a parallel and/or series relationship to achieve a desired voltage and current rating. For example, and with reference to FIG. 4, a number of individual electrochemical cells 80 may be grouped together and connected in parallel to common positive and negative power buses or lines to form a cell pack 82. A number of the electrochemical cell packs 82 may then be connected in series to form a module 84. Further, a number of individual modules 84 may be connected in series to constitute a battery 86.

Figure 4:
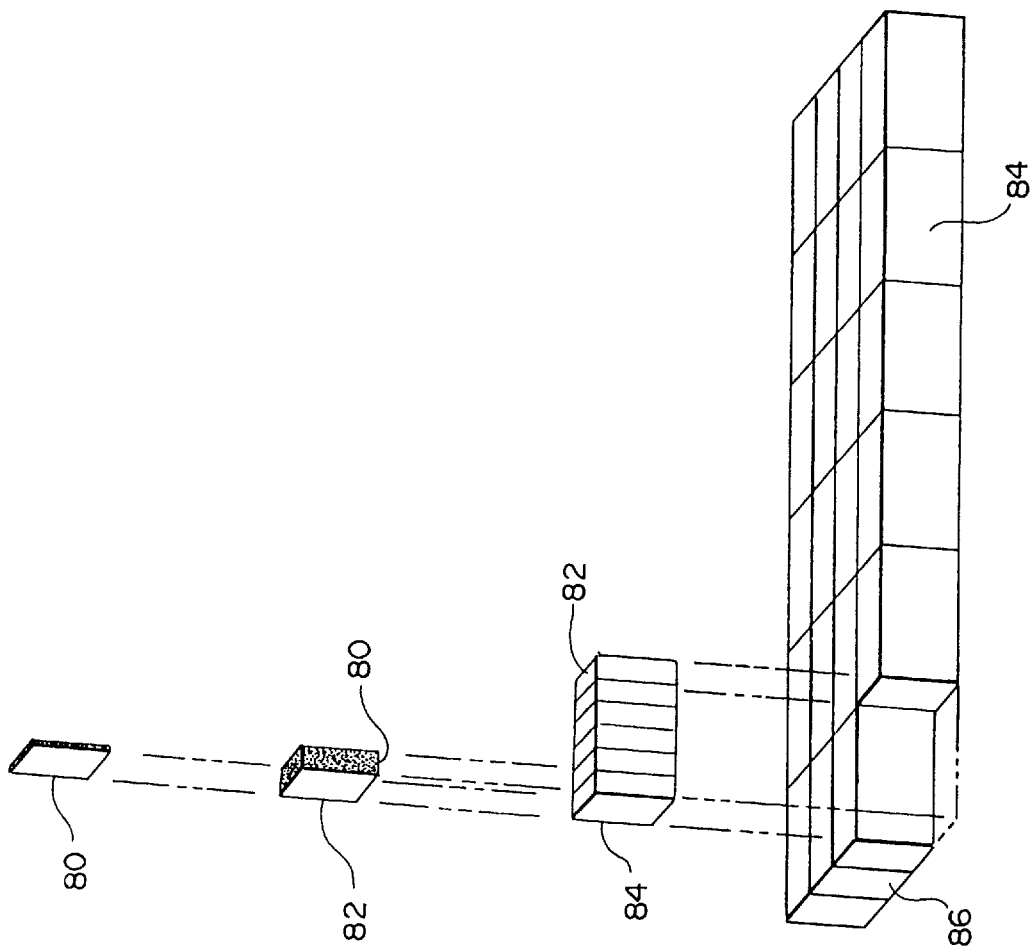
FIG. 4 illustrates various energy storage device configurations.

The embodiment shown in FIG. 4 depicts an arrangement of electrochemical cells 80 in accordance with a modular packaging approach which provides an efficient means of achieving desired power requirements for a broad range of high-power applications. In this illustrative embodiment, eight electrochemical cells 80 are grouped together and connected in parallel to form a cell pack 82. A module 84 is constituted by grouping six cell packs 82 together and connecting the packs 82 in series. A battery 86 is shown as constituting 24 modules 84 connected in series.

Given these arrangements, and assuming that each of the electrochemical cells 80 has dimensions and characteristics equivalent to those of the cell depicted in FIG. 1, each individual cell 80 provides for a total energy output of approximately 36.5 Wh. Each cell pack 82 provides for a total energy output of approximately 292 Wh, while each module 84 provides for a total energy output of 1.75 kWh. The battery 86, constituted by an array of four axially and six longitudinally oriented modules 84 connected in series, provides for a total energy output of approximately 42 kWh. It is understood that the arrangement of electrochemical cells 80 and interconnection of cells 80 forming a cell pack 82, module 84, and battery 86, may vary from the arrangements depicted in FIG. 4.

Figure 5:
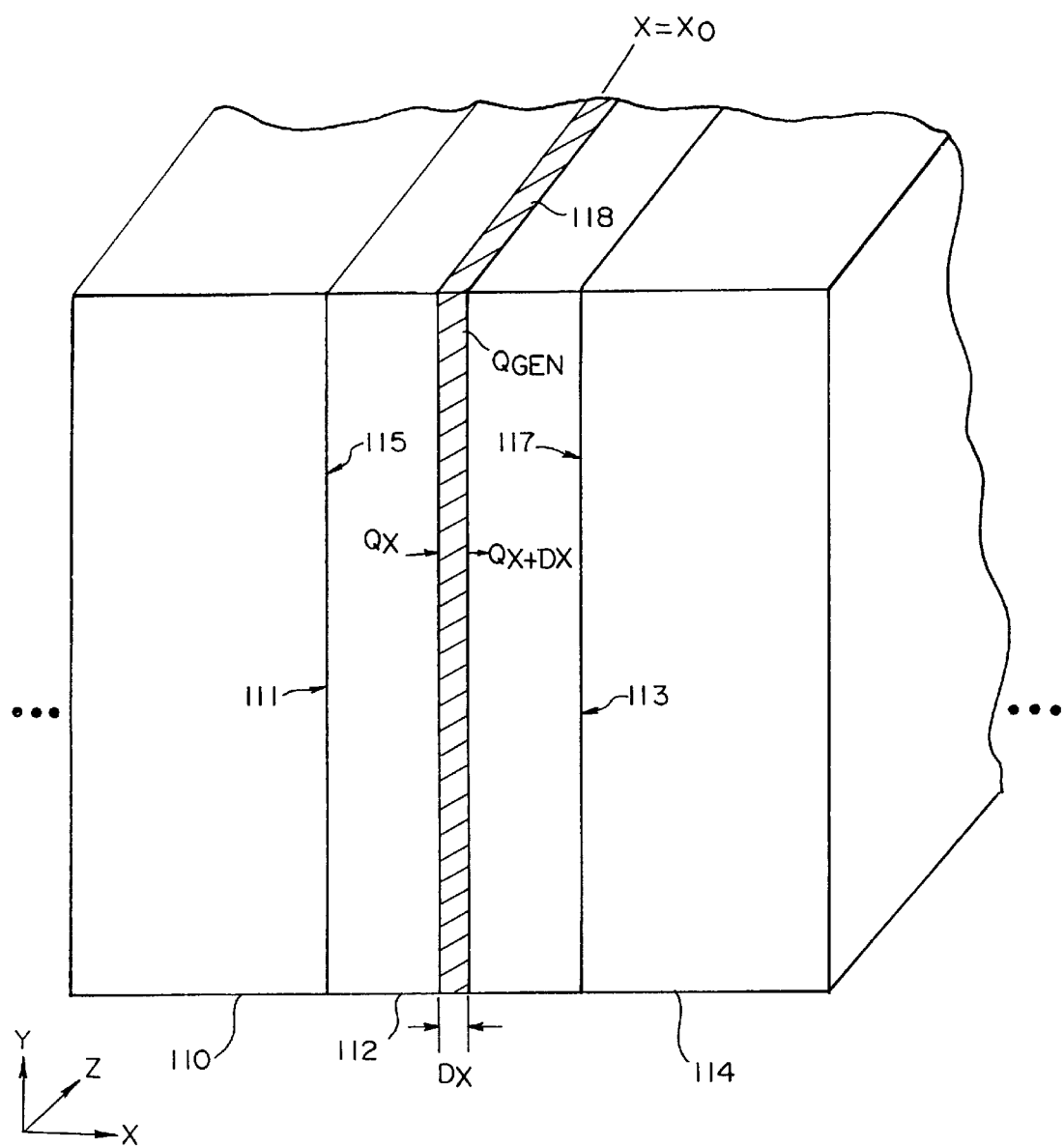
FIG. 5 is an illustration of a grouping of energy storage cells subjected to a temperature increase due to a short-circuit condition in one of the cells.

In FIG. 5, there is shown a number of electrochemical cells arranged in a stack configuration. A particular cell 112 is depicted as having sustained a short-circuit. The cell 112 generates heat as a consequence of the high rate of energy discharge resulting from the short-circuit. In accordance with this one-dimensional (x-axis) heat conduction model, the thermal energy generated by the short-circuit in the cell 112 is partially conducted through the cell 112 and to the outer surfaces 115, 117 of the cell 112. The close proximity of an adjacent cell 110 to the short-circuited cell 112 permits the thermal energy conducted to the outer surfaces 115, 117 of the cell 112 to dissipate into the adjacent cell 110.

In a similar manner, an adjacent cell 114, having an outer surface 113 in thermal contact with an outer surface 117 of the cell 112, conducts heat produced by the cell 112 through the thermal contact interface 113, 117. In this illustrative example, the adjacent cells 110, 114 include outer surfaces 111, 113 which are in intimate thermal contact with the outer surfaces 115, 117 of the cell 112. It is understood that an insert element, such as a foam or metallic flat spring element, or thermally conductive material, may be situated between adjacent cells. Although not depicted in FIG. 5, it is understood that the heat generated by the short-circuited cell 112 is also conducted in they and z directions and, in particular, to adjacent and neighboring cells via the thermal conductors and thermally conductive, electrically resistive material as is depicted in FIG. 1C.

It is believed that immediately following a short-circuit event in the cell 112, approximately 50% of the generated heat dissipates in the x-direction to adjacent cells 110, 114, while the remaining 50% is dissipated via the thermal conductors and thermally conductive, electrically resistive material. As time progresses, a disproportionate amount of the excess heat is dissipated via the thermal conductor route. It is noted that the end cells of the cell stack require the presence of an adjacently situated heat sink, such as the metal plate 75 shown in FIG. 1C, which is in intimate contact with end cell 74.

Those skilled in the art will appreciate that the energy increase within the short-circuited cell 112, and the rate at which the energy generated from the short-circuit event is dissipated into adjacent cells 110, 114, can be characterized through use of Fourier's Law of Heat Conduction. In describing a process by which heat generated from the short-circuited cell 112 is conducted to adjacent cells 110, 114, a brief discussion of a generalized one-dimensional heat conduction analysis may be useful. It is understood that the following description is provided for purposes of illustration only, and ignores three-dimensional transient heat transfer considerations.

In the energy storage system illustrated in FIG. 5, the rate at which heat flows axially through the short-circuited cell 112 is denoted as $Q_{gen}$, which represents the heat generated per unit time in the cell 112 of thickness dx. The heat conducted into the volume element 118 at a location $x=x_0$ is given by the parameter $Q_x$. The heat conducted out of the volume element 118 at a location $x=x+dx$ is given by the parameter $Q_{x+dx}$. In this simplistic description, the quantity $Q_{gen}$ represents the heat energy generated throughout the volume element 118 which is dependent on the rate of heat generation per unit volume per unit time, represented by the parameter $\dot{q}$, and the volume of the element 118. The resulting energy balance equation is given by:

$$Q_x + Q_{gen} = Q_{x+dx} \quad [1]$$

and;

$$Q_{gen} = \dot{q} A dx \quad [2]$$

where, $Q_x$, $Q_{x+dx}$, and $Q_{gen}$ represent heat flow rates measured in watts (W), $\dot{q}$ represents the rate of heat generation per unit volume per unit time measured in watts/m$^3$, dx represents the thickness of the volume element 118, and A represents the cross-sectional area of the volume element 118.

Those skilled in the art will appreciate that a temperature increase within the energy storage system shown in FIG. 5 due to a short-circuit event can be appropriately managed by understanding the thermal characteristics and energy producing capability of the cells. An in-situ thermal management system in accordance with the principles of the present invention may be employed to dissipate excess thermal energy resulting from a short-circuit event without necessity of an external active thermal management scheme, such as a forced cooling or forced convection apparatus. The in-situ thermal management methodology described herein may be implemented by understanding the heat capacity and heat dissipation characteristics of the particular cells used in an energy storage system, and appropriately limiting the energy content of the cells.

An important consideration that impacts the design of a multiple-cell energy storage system concerns the temperature at which the materials of a particular cell technology break down or degrade such that overall cell performance is significantly reduced. By way of example, a cell having a construction of the type shown in FIGS. 1A–1C and 3 has a breakdown temperature of approximately 180° C., which represents the melting point of lithium. Employment of an in-situ thermal management scheme implemented in accordance with the principles of the present invention prevents the temperature of a cell from reaching a breakdown temperature, or a safety temperature lower than the breakdown temperature, even under short-circuit conditions.

The heat dissipation characteristics of a particular cell are dependent on a number of factors, including the cell's technology, dimensions, and thermal/electrical properties. Taking into consideration these known factors, the heat dissipation characteristics of a cell may be altered and optimized. Since heat dissipation in the cell 112 is a function of thermal contact surface area with respect to contact surfaces of adjacent cells 110, 114, the maximum energy content per unit contact surface area required to maintain the cell temperature below a breakdown or safety temperature may be determined. By way of example, and with reference to FIG. 6, there is shown in graphical form a relationship between the maximum temperature of a cell having a construction as shown in FIGS. 1A–1C and 3 under short-circuit conditions and a ratio of normalized energy content-to-contact surface area for the cell. It is to be understood that the graph of FIG. 6 characterizes a cell having a particular chemistry and having particular geometric and thermal/electrical properties.

Using the graph shown in FIG. 6, the energy content of a cell and the physical dimensions of the cell may be selected so that the ratio of energy content-to-cell surface area is kept within a range such that the maximum cell temperature remains below a breakdown or safety temperature, even under short-circuit conditions. An energy content-to-contact surface area ratio of less than approximately 0.0050 Wh/cm² for a thin-film lithium polymer cell will ensure that a worst-case temperature resulting from a short-circuit in the cell does not exceed the melting point of the lithium elements within the cell (i.e., 180° C.).

Figure 6:
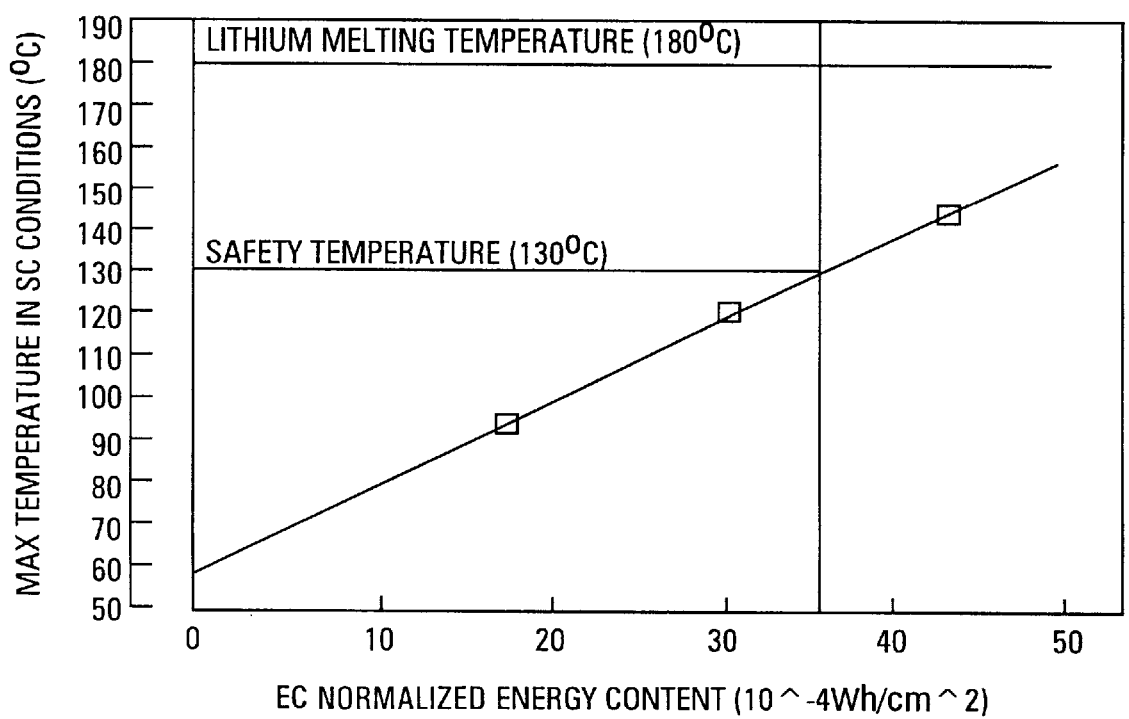
FIG. 6 is a graphical representation of a relationship between maximum temperature of a cell under short-circuited conditions and normalized energy content of a cell, the graph providing ratios of energy content-to-contact surface area for adjacently disposed cells.

If it desired to design the cell to ensure that a maximum short-circuited cell temperature does not exceed a safety temperature, such as 130° C., the energy content and contact surface area of the cell may be appropriately selected using the graph of FIG. 6. It is understood that graphs similar to that shown in FIG. 6 which characterize maximum cell temperature under short-circuit conditions relative to the ratio of energy content-to-contact surface area may be developed for energy storage cells constructed using technologies other than those described herein. It is noted that FIG. 18, for example, depicts a relationship between energy content and maximum cell temperature for a cell having a similar construction as that shown in FIGS. 1A–1C and 3 but a different cathode oxide.

Figure 7:
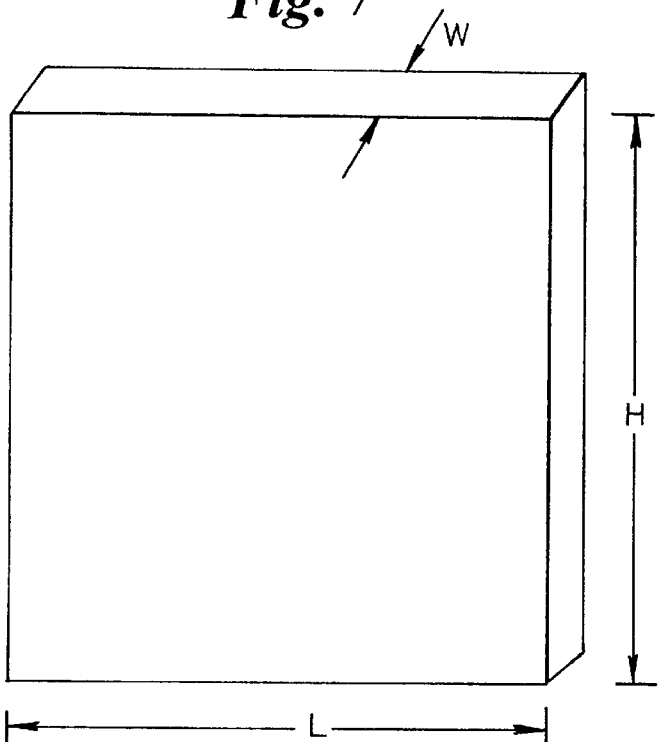
FIGS. 7–9 illustrate various cell configurations that exhibit productive ratios of energy content-to-contact surface area.
Figure 8:
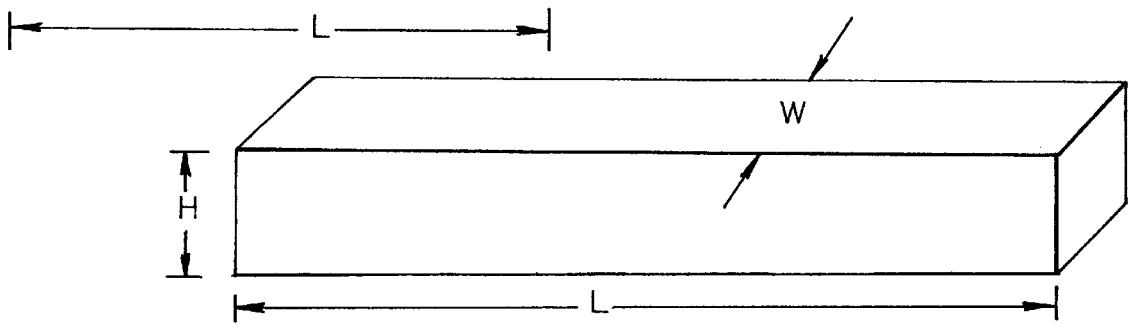
Figure 9:
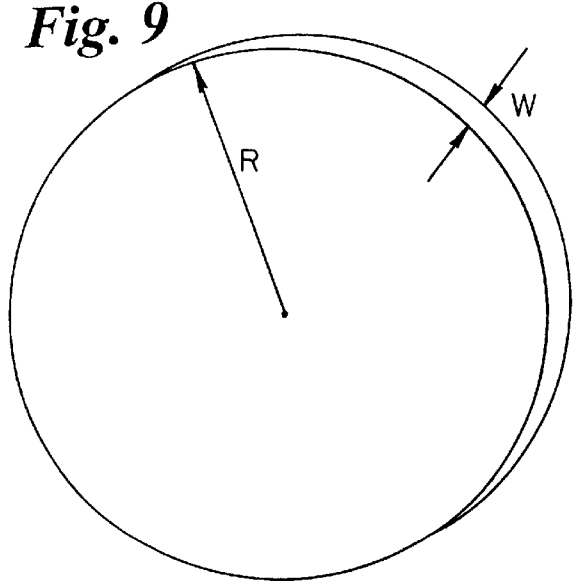

The depictions of energy storage cells shown in FIGS. 7–9 are provided to illustrate that an in-situ thermal management design approach may be employed for energy storage cells having varying configurations. For example, the length (L), height (H), width (w), or radius (r) may be varied as needed for a given application, with the constraint that the ratio of energy content-to-contact surface area remain in a range that prevents the worst-case cell temperature from exceeding the cell breakdown temperature.

In order to facilitate the proper design and manufacture of thermally stable energy storing modules and devices which contain a number of closely situated electrochemical cells of a given technology, it is useful to express the maximum temperature achievable by the cells under worst-case conditions (i.e., a short-circuit) as a function of several variables, including the ratio of energy content of the cell to cell volume, conductivity of the cells, thermal conductance, and cell thickness. The following equations characterize the maximum temperature, ($T_{max}$), of a short-circuited cell of a given technology when the cell is packaged in an energy storing module such as that depicted in FIGS. 4, 10, and 14. It is noted that the equations below were developed by use of numerical simulations of a multiple-cell module at an initial operating temperature of 60° C. It is further noted that these equations were developed based on a cell technology implicated in FIG. 18. Using the following equations, it is possible to calculate the conductance of a thermal conductor required to safely dissipate excess heat generated by a short-circuited cell.

Equation [3] below mathematically characterizes the maximum cell temperature of a thin-filmed electrochemical cell, which does not include a foam core element, as a function of various operative parameters. The dimensions of the cell characterized in Equation [3] are given as 0.135 m×0.149 m×0.054 m. The maximum cell temperature for the cell is given by:

$$T_{max} = 1/1.1 \cdot 1/1.2 \cdot 0.037738 \cdot (1/(\rho_{cell} \cdot Cp_{cell}))^{0.3856} \cdot (Q/kcell) \cdot (\delta)^{0.6146} \cdot (K/L)^{-0.077} \quad [3]$$

where, $T_{max}$ represents the maximum temperature reached by a short-circuited cell in a module (°C.), $\rho_{cell}$ represents the density of the cell (kg/m³), $Cp_{cell}$ represents the heat capacity of the cell (J/kgK), Q represents the energy content of one cell per unit volume (Wh/m³), kcell represents the conductivity of the cell in the cell-to-cell axial direction (W/mK), $\delta$ represents cell thickness in the cell-to-cell axial direction (mm), and K/L represents the conductance of the thermal conductor (W/m²K).

Using Equation [3] above, a relationship between maximum temperature of a short-circuited cell as a function of the cell's energy content for a given cell chemistry and configuration may be developed. A relationship between maximum cell temperature as a function of cell thickness may also be developed. By way of example, and with reference to FIGS. 18–19, there is depicted a relationship between maximum cell temperature as a function of energy content and cell thickness, respectively. The data reflected in FIGS. 18–19 was developed with the following variables held constant: kcell=0.4 W/mK, K/L=400 W/m²K, $\rho_{cell} \cdot Cp_{cell}$=1218·1435 J/m³K.

Figure 18:
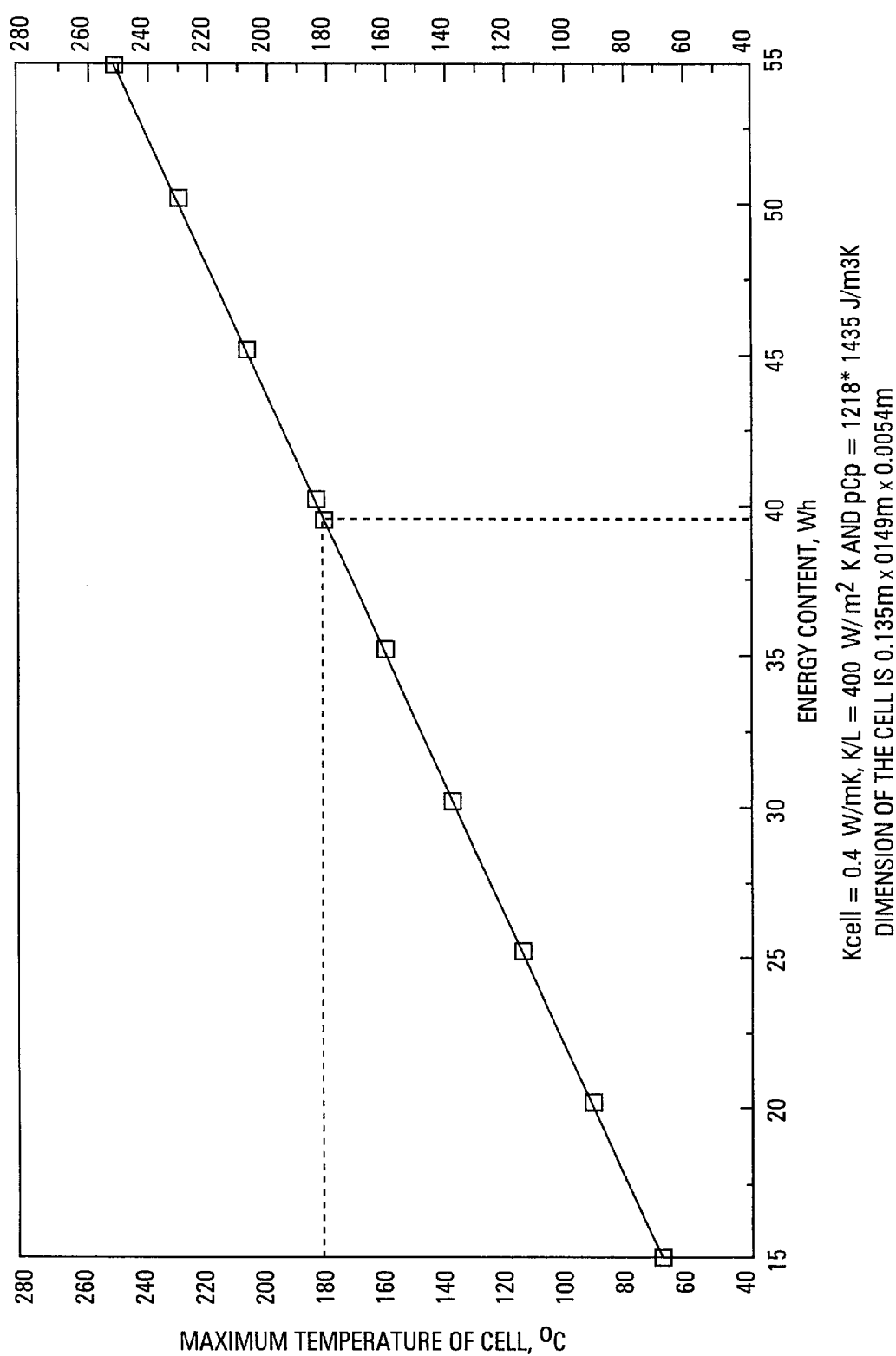
FIGS. 18–19 illustrate in a graphical form a relationship between maximum cell temperature of an energy storing module and the energy content and thickness of the cell, respectively.
Figure 19:
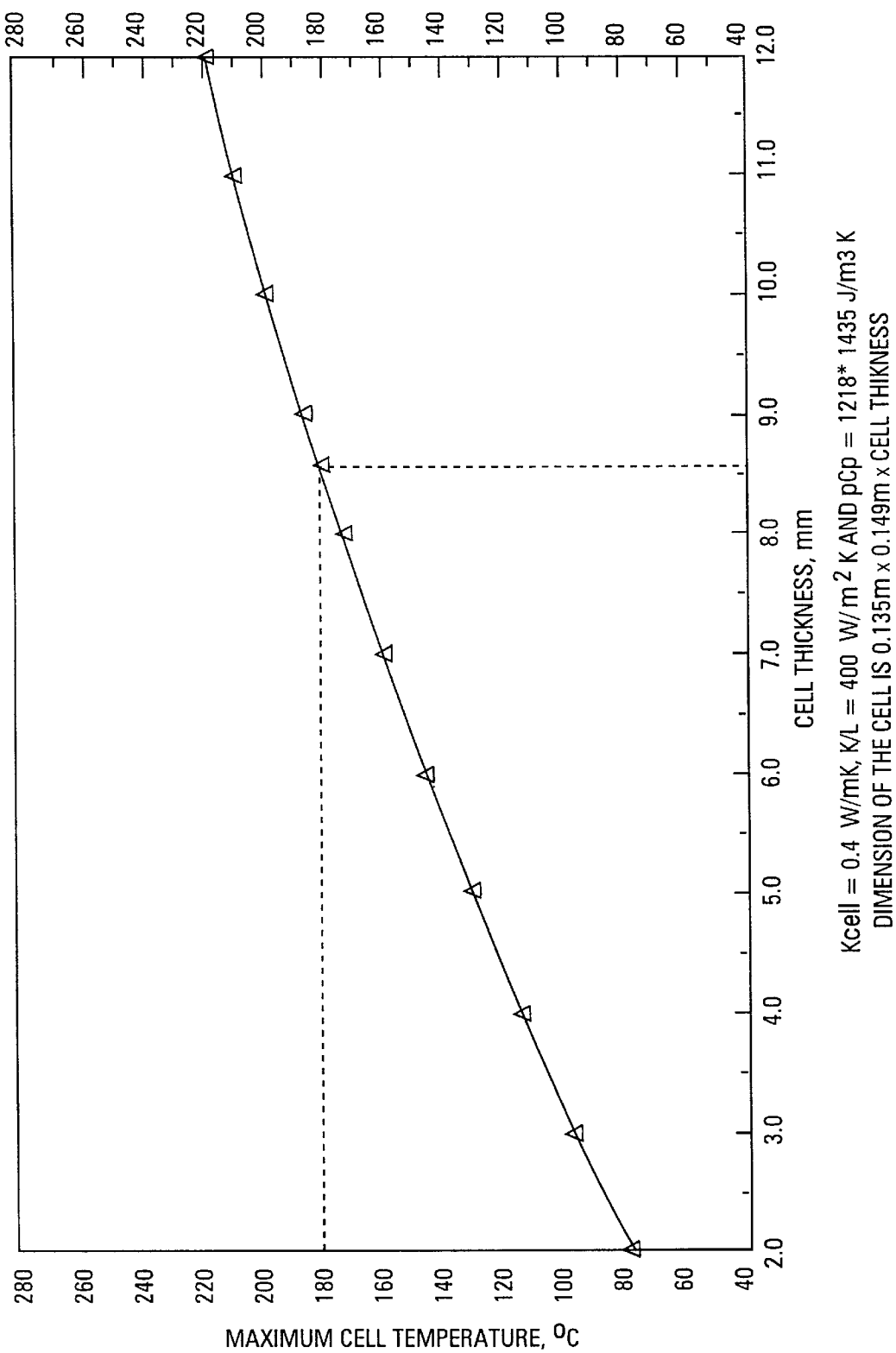

It can be seen from FIG. 18 that a thin-film electrochemical cell of the type characterized above should have an energy content which is limited to less than approximately 38 Wh to ensure that the maximum temperature of the cell will not exceed a breakdown temperature, such as the melting point of lithium (i.e., 180° C.). It is interesting to note the linearity of the maximum cell temperature-to-energy content relationship depicted in FIGS. 18 and 6, given the difference in cell technology. It can be seen from FIG. 19 that the thickness of the cell should not exceed approximately 8.5 mm in order to ensure that the maximum temperature of the cell does not exceed the 180° C. breakdown temperature.

Equation [4] below characterizes maximum cell temperature for an energy storing module of the same cell technology as that implicated in Equation [3] in which some of the cells include a foam core element compressed to approximately 2 mm. More specifically, Equation [4] characterizes maximum cell temperature for a module design in which compressed foam core elements are provided in every two electrochemical cells. In this case, maximum cell temperature for such a module configuration is given by:

$$T_{max} = 0.037738 \cdot (1/(\rho_{cell} \cdot Cp_{cell}))^{03856} \cdot (Q/k\text{cell}) \cdot (\delta)^{0.6146} \cdot (K/L)^{-0.077} \quad [4]$$

It is interesting to note that Equations [3] and [4] differ only by constants (i.e., the constants 1/1.1 and 1/1.2 in Equation [3]).

Equation [5] characterizes the maximum cell temperature for a module having cells of the same technology implicated in Equations [3]–[4], wherein the cells incorporate a foam core element that is thinner than the element associated with Equation [4] above. More specifically, Equation [5] below assumes that a foam core element having a thickness of approximately 1/32 inches is provided in every two cells of the cell stack. The foam core element is fabricated from Poron S2000. The maximum cell temperature for a module having this configuration is given by:

$$T_{max} = 1/1.1 \cdot 0.037738 \cdot (1/(\rho_{cell} \cdot Cp_{cell}))^{03856} \cdot (Q/k\text{cell}) \cdot (\delta)^{0.6146} \cdot (K/L)^{-0.077} \quad [5]$$

It is noted that the term $\rho_{cell} \cdot Cp_{cell}$ allows Equations [3]–[5] to be used to quantify the effect of heat capacity of the components within the cell on the maximum cell temperature, $T_{max}$, reached during a short-circuit event. These equations, therefore, may be used to characterize maximum cell temperatures under similar situations for energy storing cells of differing technologies.

These equations may also be employed to characterize the effects of modifications and improvements in cell design and construction. It is noted that the numerical simulations used to develop Equations [3]–[5] were directed to the investigation of electrochemical cells having an energy content that varied from approximately 30 to 40 Wh, a cell thickness, 6, that varies from approximately 5.4 and 7.8 mm, and cells that utilize a thermal conductor having a conductance value, K/L, that varies between approximately 200 and 600 W/m²K.

The in-situ thermal management approach described above with reference to FIGS. 1C and 5 is generally applicable for managing short-circuit temperature increases occurring in a single cell of a grouping of cells. In applications in which a significant number of parallel connected cells are configured in a stack or bundle, an enhanced in-situ short-circuit protection scheme may be implemented to prevent thermal runaway within the cell stack, and to isolate a particular cell from the parallel connection upon occurrence of a short-circuit in the cell.

Figure 10:
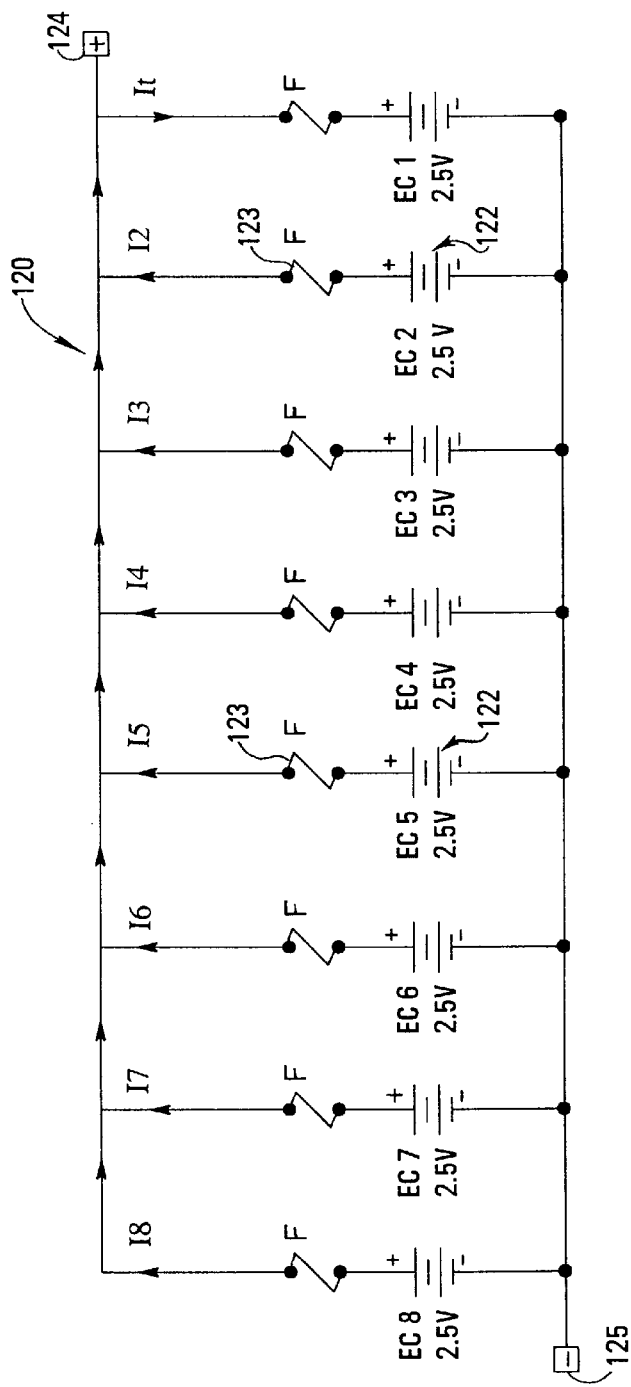
FIG. 10 shows an embodiment of a multiple-cell energy storage device in which one of the cells is subject to a short-circuit condition.
Figure 11:
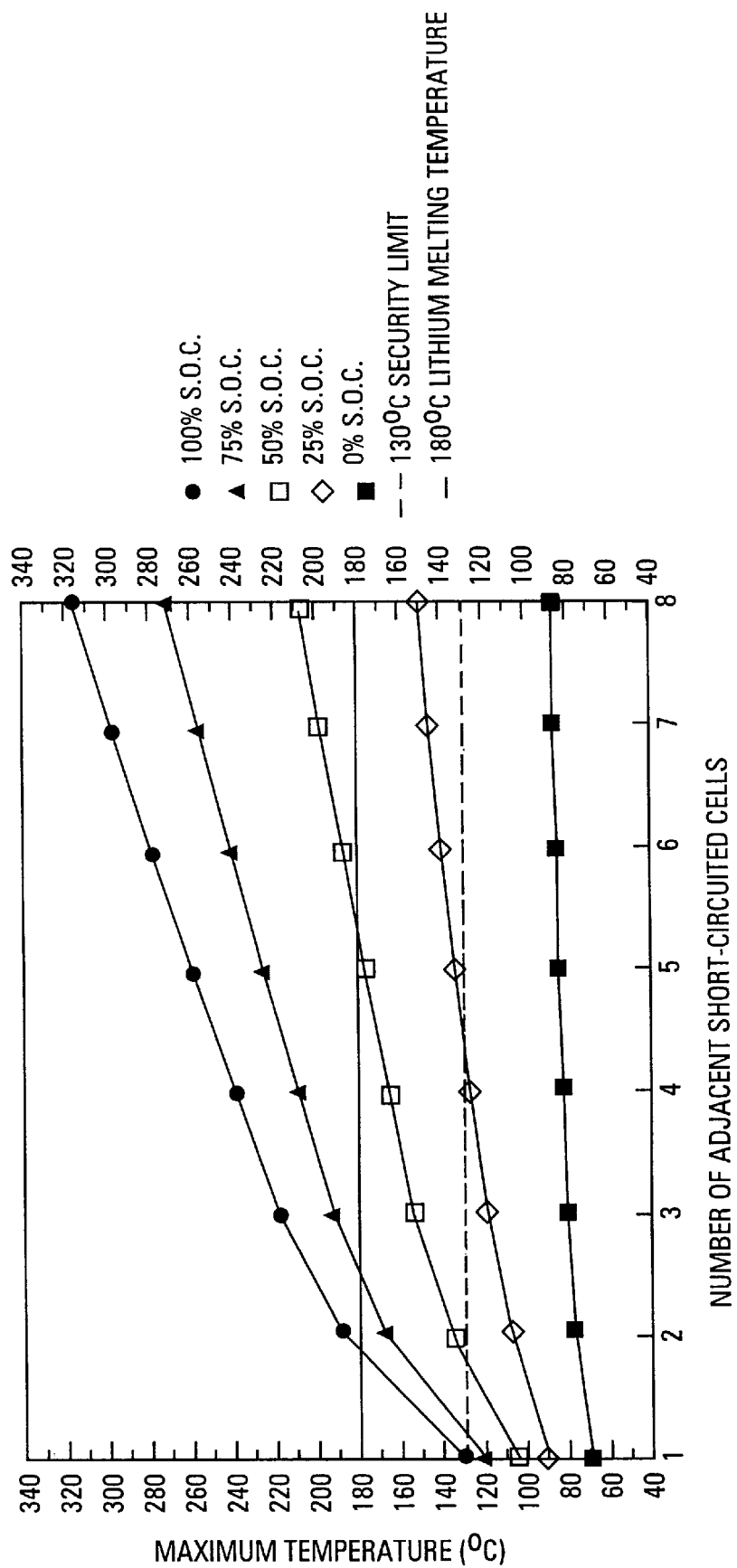
FIG. 11 illustrate a relationship between the maximum temperature in a cell stack as a function of the number of adjacent short-circuited cells at five difference state of charge (SOC) levels.

In the embodiment of an energy storage system illustrated in FIG. 10, the energy storage device 120 includes eight energy storage cells respectively connected in parallel to common positive and negative terminals 124, 125. The cell EC1 is shown as a short-circuit. Given this arrangement, and with reference to FIG. 11, it can be seen that only one short-circuited cell within a stack of eight cells can be managed using the above-described in-situ thermal management methodology without exceeding the breakdown temperature of the cell material. An in-situ short-circuit protection device may be incorporated into an energy storage system to prevent multiple short-circuit events from occurring.

In accordance with one embodiment of the present invention, and as shown in FIG. 10, a fuse 123 is connected in series with a respective cell 122 within the multiple-cell energy storage device 120. In the event that a short-circuit occurs in any of the parallel connected cells 122, the fuse 123 of the defective cell 122 blows so as to electrically isolate the short-circuited cell 122 from the parallel connection. The heat generated during development of the short-circuit in the cell 122 and after blowing of the fuse 123 is conducted to cells adjacent the defective cell 122 in a manner previously described. As such, the maximum temperature attainable by a cell under worst-case conditions is well below the breakdown temperature of the cell. More particularly, the data of FIG. 11 confirms that the temperature of a short-circuited cell within the cell stack never exceeds a safety temperature of 130° C. when an in-situ short-circuit protection device is employed.

Figure 12:
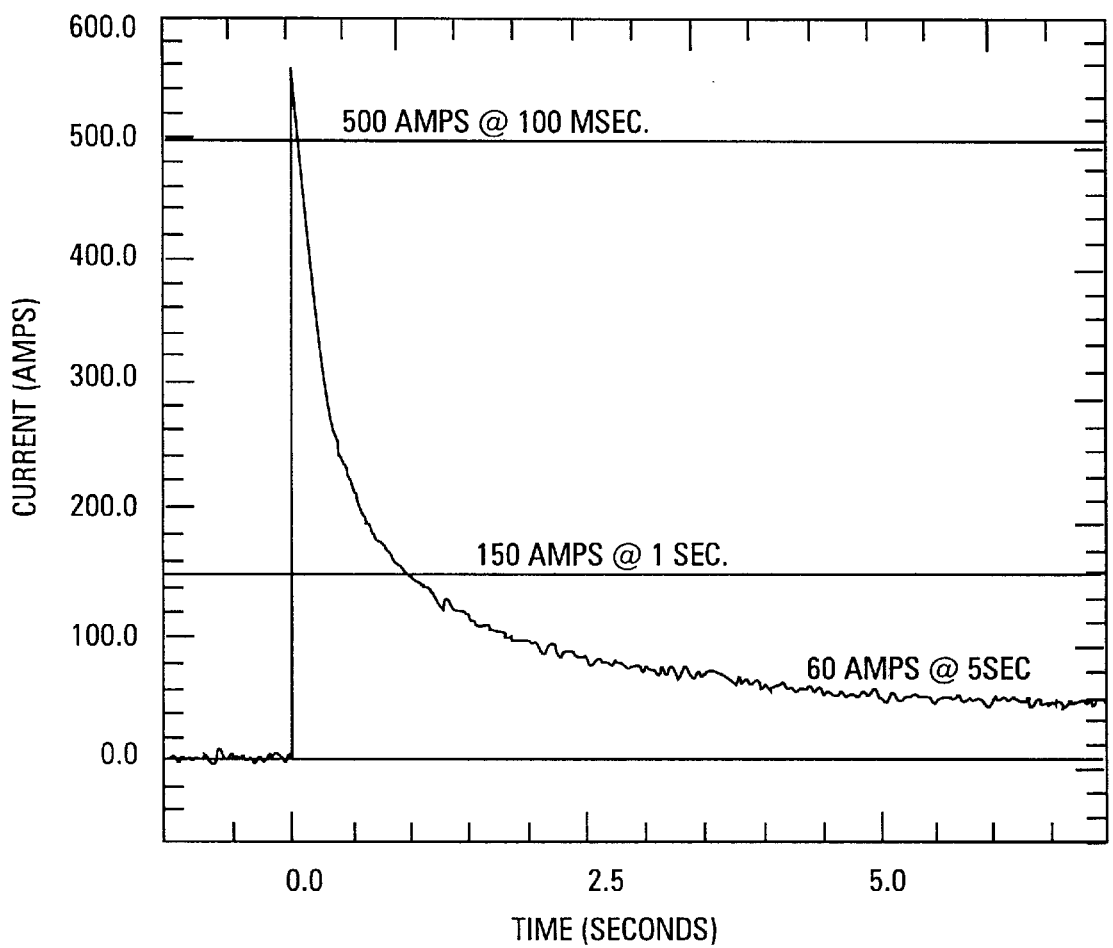
FIG. 12 illustrates a characteristic current waveform for an electrochemical cell upon occurrence of a short-circuit in the cell.

Referring now to FIG. 12, there is illustrated a graph which characterizes the effect on cell current upon the occurrence of a short-circuit in a thin-film electrochemical cell. A thin-film cell of the type shown in FIGS. 1A–1C and 3, as well as other types of high-energy cells, exhibit a significant short-term increase in cell current due to the capacitive characteristics of the cell. For example, the current in the cell characterized in FIG. 12 spikes at a value in excess of 500 A in less than approximately 100 milliseconds. Following the current spike, the current in the cell rapidly decays to approximately 150 A after 1 second, and gradually decays thereafter. At 5 seconds following the short-circuit event, the cell current reaches a value of approximately 60 A.

The characteristic current spike that occurs immediately after a short-circuit event in a high-energy cell is advantageously exploited by an in-situ short-circuit protection device implemented in accordance with the principles of the present invention. In the embodiment shown in FIG. 10, for example, each of the fuses 123 connected in series with a corresponding energy storage cell 122 are designed to activate in response to a current spike generated from a short-circuit in the cell 122. A fuse 123 typically has a current rating that prevents the fuse from activating during normal operation, yet permits the fuse to activate in response to a short-circuit condition. Exploiting the current spike as a triggering mechanism for the fuse 123 provides for a large current gap between the maximum operating current level of the cell 122 and the minimum activation current level of the fuse 123.

In accordance with one embodiment, the parallel connected cells of an energy storage device have a structure and behavior similar to those previously described with reference to FIGS. 1A–1C and 3. In such a configuration, the fuses connected in series with the cells have a current rating of approximately 50 A. By utilizing the capacitive effect of the cell to trigger the 50 A fuse, unintentional activation of the fuse is avoided, providing for both safe and reliable short-circuit protection of the energy storage device.

In some applications, protection against accidental shorting of an energy storage device or cell, such as through a foreign conductive implement or material, may be of primary concern. It may be desirable, therefore, to employ a fuse that is activated more slowly than the fast acting fuse described above. For example, a fuse that activates after several hundred milliseconds or several seconds after occurrence of a short-circuit in the cell may be employed. Although excess heat is generated between the time the short occurs and the time the fuse blows, the in-situ thermal management methodology described previously provides for the safe dissipation of such excess heat.

Figure 13:
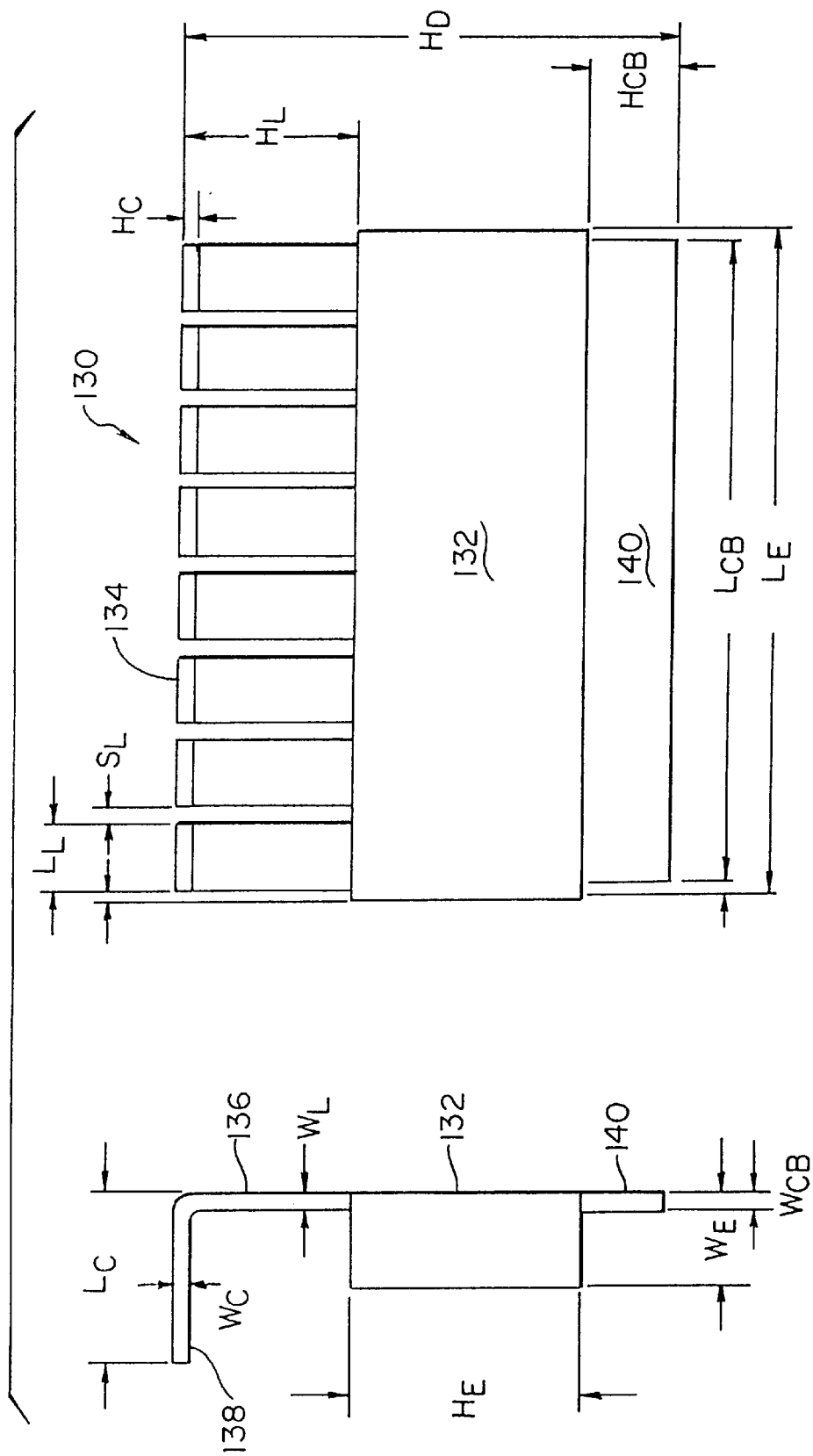
FIG. 13 is an embodiment of an integrated short-circuit protection device in accordance with an embodiment of the present invention.

In FIG. 13, there is illustrated an embodiment of a short-circuit protection device fabricated in an integrated package. The integrated device 130 includes an enclosure 132 within which eight fuses (not shown) are mounted. A first contact of each fuse is connected in series with a corresponding one of eight terminals 134, and a second contact of the each fuse is connected to a common bus 140. Each of the terminals 134 includes a lead 136 and a contact 138. When the short-circuit protection device 130 is connected to an array of cells, each of the contacts 138 engages a corresponding contact of one of eight cells in the array. The common bus 140 is typically coupled to one or more common busses of other short-circuit protection devices 130 connected to corresponding cell arrays to form a series connected energy storage device, such as a module.

In one embodiment, the enclosure 132 has a height, $H_E$, of 16.00 mm, a width, $W_E$, of 7.49 mm, and a length, $L_E$, of 50.80 mm. The lead portion 136 of the terminal 134 has a height, $H_L$, of 12.70 mm, a width, $W_L$, of 1.27 mm, and a length, $L_L$, of 5.00 mm. The contact portion 138 of the terminal 134 has a height, $H_C$, and a width, $W_C$, of 1.27 mm, and a length, $L_C$, of 13.03 mm. The common bus 140 has a height, $H_{CB}$, of 6.35 mm, a width, $W_{CB}$, of 1.27 mm, and a length, $L_{CB}$, of 49.02 mm.

Figure 14:
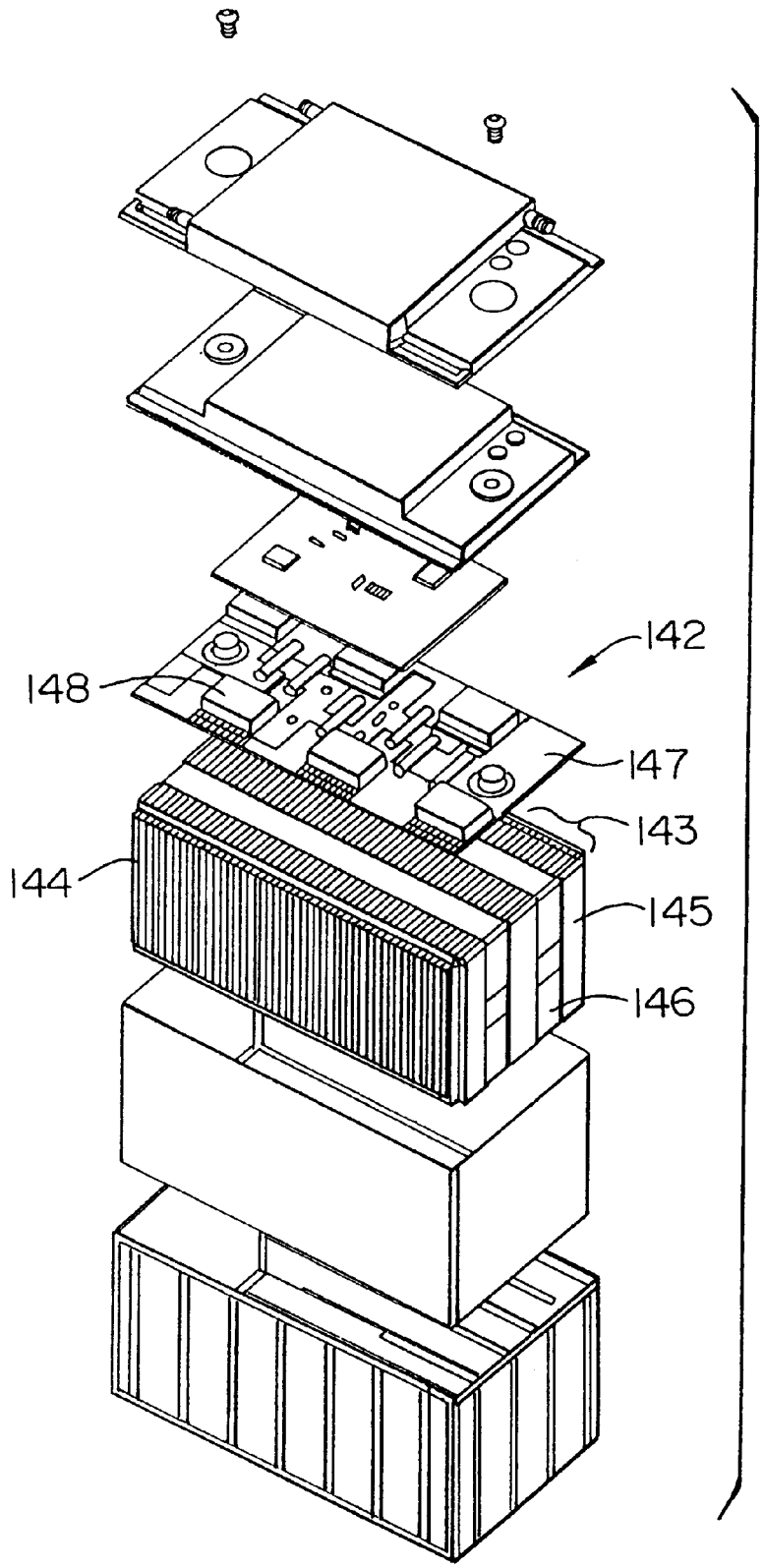
FIG. 14 is an exploded view of an energy storing module containing a number of interconnected thin-film electrochemical cells.

In FIG. 14, there is shown an exploded view of an embodiment of an energy storing module 142 which houses a number of electrochemical cells 144, interconnection hardware, and control hardware and software. In accordance with one embodiment, the module 142 includes a stack of 48 electrochemical cells 144 which are interconnected through use of a interconnect board 147. Short-circuit protection circuitry, such as an integrated short-circuit protection pack 148, is typically provided on the interconnect board 147. Each of the six integrated short-circuit protection packs 148 disposed on the interconnect board 147 electrically couple to a corresponding one of six cell packs 143 upon mounting the interconnect board 147 in place above the stack of cells 144.

The volume of an electrochemical cell of the type described previously with regard to FIG. 1 varies during charge and discharge cycling due to the migration of lithium ions into and out of the lattice structure of the cathode material. This migration creates a corresponding increase and decrease in total cell volume on the order of approximately five to six percent during charging and discharging, respectively. In order to accommodate variations in cell volume resulting from charge and discharge cycling of a grouping of cells, a pressure producing apparatus is employed to maintain the cells in a continuous state of compression to ensure continuous intimate contact between cell of the cell stack. It is considered desirable that the compressive forces, whether produced internally or externally of the cell, be distributed fairly uniformly over the surface of application.

The stack of electrochemical cells 144 shown in FIG. 14 are banded together by use of two bands 146 and two opposing thrust plates 145. The 48 electrochemical cells 144 are subjected to continuous compressive forces generated by use of the bands 146/thrust plates 145 and a foam or spring-type element disposed in each of the cells 144 and/or between all or selected ones of the cells 144. It is noted that the foam or spring-type core element provided in the center of each of the cells 144 serves to distribute pressure evenly between the cells 144, which is of particular importance as cell volumes change during charge and discharge cycling.

Figure 15:
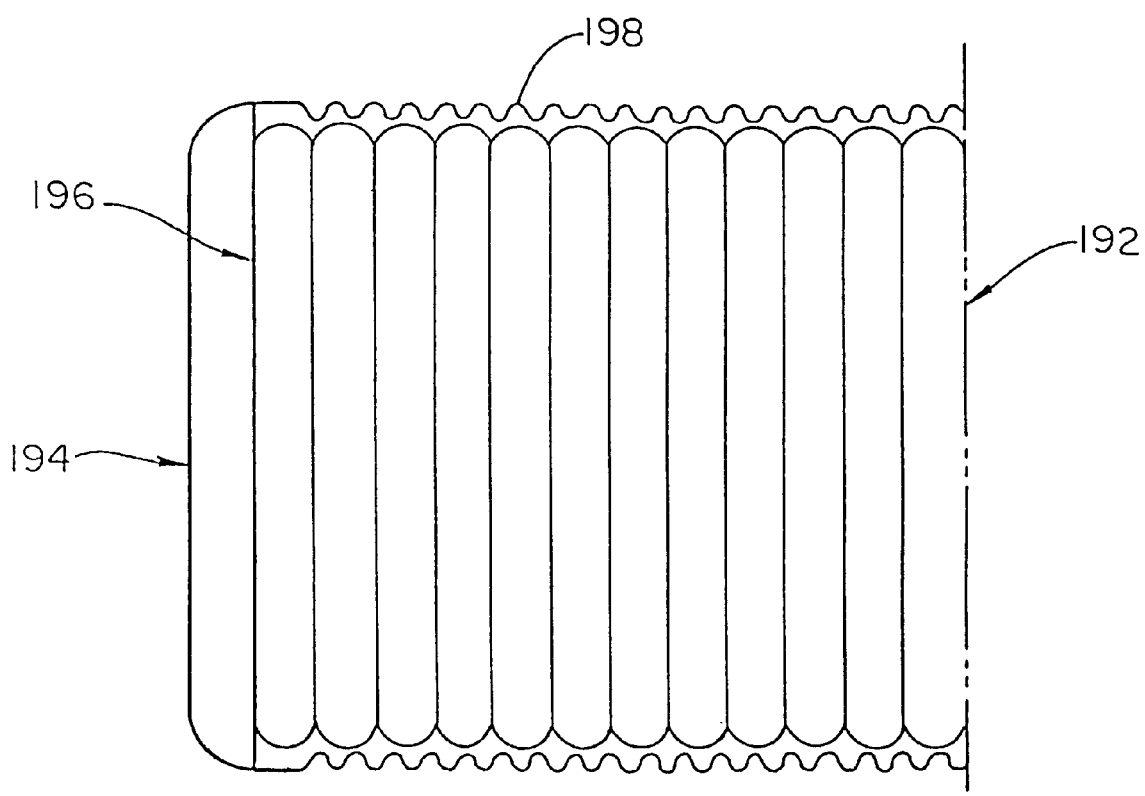
FIG. 15 is a cross-sectional illustration of an embodiment of a pressure generating apparatus for maintaining a stack of electrochemical cells in a state of compression.
Figure 17:
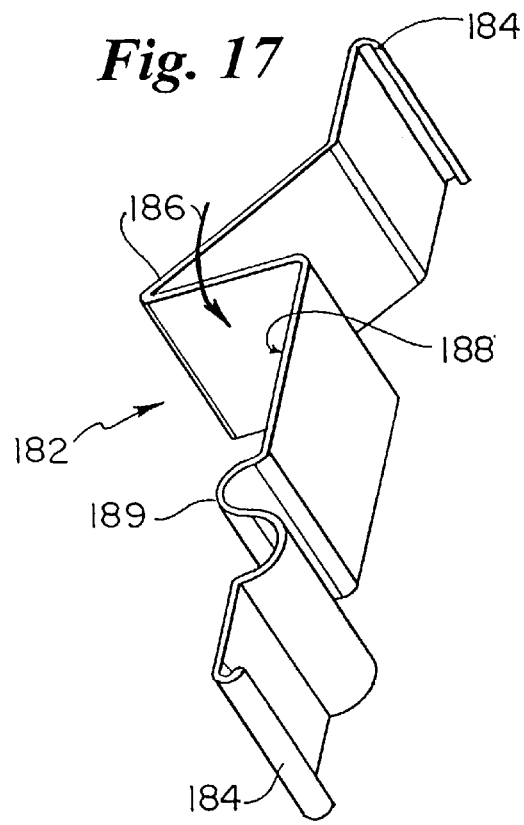
FIG. 17 is a perspective view of the tension producing clamp shown in FIG. 16.

In the embodiment illustrated in FIG. 15, a metal strap 194 includes a wave-like spring 198 which generates tension forces that cause the thrust plates 194, in turn, to exert compressive forces on the cell stack 192. It is understood that the tension spring apparatus illustrated in FIG. 15 may be implemented using a number of coil springs or using elastomeric material, and that a combination of metallic and elastomeric spring materials may also be advantageously employed. Further, it will be appreciated that foam or other spring elements may be incorporated within the cell stack and/or within individual cells in combination with a tension spring apparatus external to cell stack.

Figure 16:
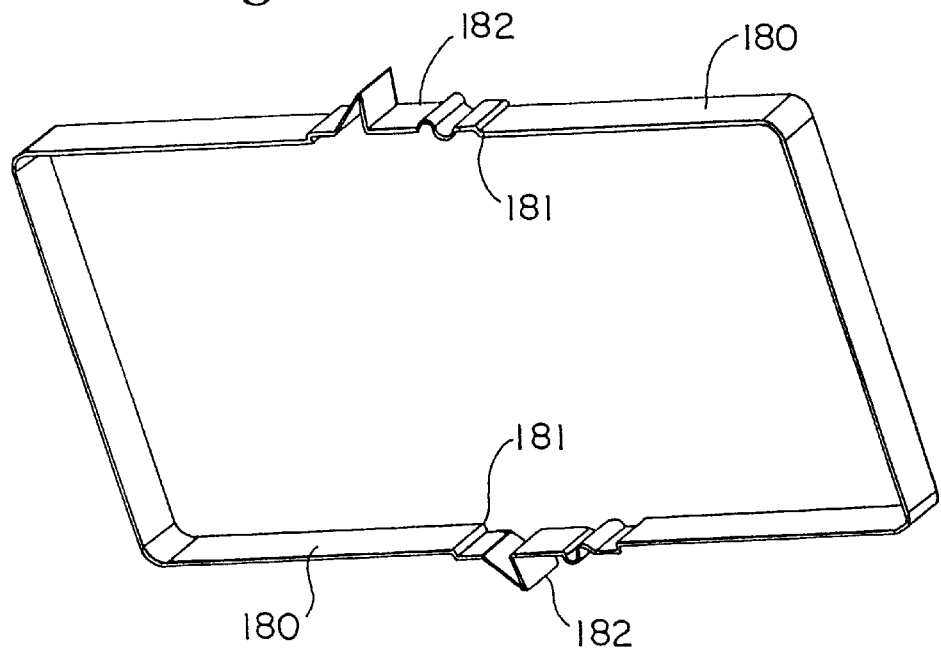
FIG. 16 is an illustration of a band or strap including a tension producing clamp for use in a pressure generating apparatus for maintaining a stack of electrochemical cells in compression during charge and discharge cycling.

FIG. 16 illustrates an embodiment of a strap apparatus 180 which is particularly useful in constraining a number of electrochemical cells configured as a stack or bundle. In contrast to a strap apparatus which is substantially non-extendible in its length, the strap apparatus shown in FIG. 16 incorporates a unique clamp 182 which significantly enhances the efficacy of a cell stack pressure system. The strap apparatus includes two bands 180 each having C-shaped ends 181. A clamp 182 is attached to a band 180 by coupling the C-shaped ends 181 of the band 180 with corresponding C-shaped ends 184 of the clamp 182. It is assumed that the bands 180 are disposed around the stack of cells in a manner as shown in FIG. 15. The clamp 182 includes a hinge 186 integral to the clamp 182 which is collapsible onto a contact surface 188 of the clamp 182 when subjected to sufficient force.

When the hinge 186 is collapsed onto the contact surface 188, the C-shaped ends 184 of the clamp 182 are pulled towards each other which, in turn, produces a tension force in the C-shaped ends of the bands 180. The magnitude of the tension force induced in the bands 180 by actuation of the clamps 182 is moderated by a sign wave-shaped spring 189 integral to the clamps 182. The sign wave-shaped spring 189 may be configured, in terms of shape, thickness, and material, to provide for a desired amount of expansion and retraction of the strap apparatus during charge/discharge cycling of the cells. Other useful pressure generating mechanisms are disclose in co-pending patent application Ser. No. 08/900,429 entitled "Pressure System and Method for Rechargeable Thin-Film Electrochemical Cells" (Hoffman et al.), the contents of which are incorporated herein by reference.

It will, of course, be understood that modifications and additions can be made to the various embodiments discussed hereinabove without departing from the scope or spirit of the present invention. By way of example, a short-circuit protection device may include thermally activated fuses, such as Model NTE8090 manufactured by NTE Electronics, rather those described herein. Thermally activated fuses typically activate at a prescribed temperature, such as a temperature below a breakdown temperature. Also, a thermally activated fuse may be connected in series with a current activated fuse which provides for increased activation reliability. Further, the principles of the present invention may be employed for use with battery technologies other than those exploiting lithium polymer electrolytes, such as those employing nickel metal hydride (Ni-MH), lithium-ion, (Li-Ion), and other high energy battery technologies. Accordingly, the scope of the present invention should not be limited by the particular embodiments discussed above, but should be defined only by the claims set forth below and equivalents thereof.

What we claim is:

1. An in-situ thermal management system for an energy storing unit, comprising:
 a plurality of thin-film electrochemical cells each being coupled in parallel to common positive and negative connections, each of the electrochemical cells having a ratio of energy content-to-contact surface area such that thermal energy produced by a short-circuit in a particular cell of the plurality of cells is conducted to a thermal conductor connected to each of the cells and to a cell adjacent the particular cell so as to prevent a temperature of the particular cell from exceeding a breakdown temperature; and
 a plurality of fuses each coupled in series with one of the electrochemical cells, a fuse coupled to the particular cell being activated by a current spike capacitively produced by the particular cell upon occurrence of the short-circuit in the particular cell, thereby electrically isolating the particular cell from the common positive and negative connections.

2. The system of claim 1, wherein the fuses are activated by a current spike having an amperage ranging between approximately 300 A and 600 A.

3. The system of claim 1, wherein the fuses have a current rating of approximately 50 A.

4. The system of claim 1, wherein the fuses are fabricated as an integrated package.

5. The system of claim 1, wherein the breakdown temperature represents a melting temperature of the particular cell.

6. The system of claim 1, wherein the ratio of energy content-to-contact surface area is less than approximately 0.006 Wh/cm$^2$.

7. The system of claim 1, wherein each of the plurality of electrochemical cells has a prismatic configuration.

8. The system of claim 1, wherein each of the plurality of electrochemical cells has a surface area ranging between approximately 100 cm$^2$ and 400 cm$^2$ and an energy content ranging between approximately 10 Wh and 40 Wh.

9. An in-situ thermal management system for an energy storing unit, comprising:
 a plurality of energy storing cells connected in parallel to common positive and negative connections and maintained in a state of compression, a thermal conductor connected to each of the cells; and
 a plurality of short-circuit protection devices each being coupled in series to one of the plurality of energy storing cells, a particular short-circuit protection device of the plurality of short-circuit protection devices coupled to a particular cell of the plurality of cells being activated by a current spike capacitively produced upon occurrence of a short-circuit in the particular cell, the particular cell being electrically isolated from the common positive and negative connections upon activation of the particular short-circuit device.

10. An in-situ thermal management system for an energy storing unit, comprising:
 a plurality of substantially planar thin-film electrochemical cells each having a breakdown temperature;
 the plurality of electrochemical cells being arranged such that a planar surface of a particular cell of the plurality of cells is in thermal contact with a planar surface of a cell disposed adjacent the particular cell; and
 the planar surfaces of the particular cell and the adjacent cell each having a ratio of energy content-to-contact surface area such that thermal energy produced by a short-circuit condition arising in the particular cell is conducted to a thermal conductor connected thereto and to the adjacent cell so as to prevent a temperature of the particular cell from exceeding the breakdown temperature.

11. The system of claim 10, wherein each of the plurality of electrochemical cells comprises lithium, and the breakdown temperature represents a melting temperature of lithium.

12. The system of claim 10, wherein the planar surfaces of the particular and adjacent cell each have a ratio of energy content-to-contact surface area such that thermal energy produced by the short-circuit condition occurring in the particular cell is conducted to the adjacent cell so as to prevent a temperature of the particular cell from exceeding a safety temperature, the safety temperature being lower than the breakdown temperature.

13. The system of claim 12, wherein the safety temperature is 130° Celsius.

14. The system of claim 10, wherein the ratio of energy content-to-surface area is less than approximately 0.006 Wh/cm$^2$.

15. The system of claim 10, wherein the ratio of energy content-to-surface area ranges between approximately 0.0034 Wh/cm$^2$ and 0.0038 Wh/cm$^2$.

16. The system of claim 10, wherein each of the plurality of electrochemical cells has a prismatic configuration.

17. The system of claim 10, wherein each of the plurality of electrochemical cells has a surface area ranging between approximately 100 cm$^2$ and 400 cm$^2$.

18. The system of claim 10, wherein each of the plurality of electrochemical cells has an energy content ranging between approximately 10 Wh and 40 Wh.

19. The system of claim 10, wherein each of the plurality of electrochemical cells has a thickness that varies between approximately 3 mm to 10 mm and the ratio of energy content-to-contact surface area is less than approximately 0.006 Wh/cm$^2$.

20. The system of claim 1, wherein each of the plurality of fuses comprises a thermal fuse.

* * * * *

UNITED STATES PATENT AND TRADEMARK OFFICE
CERTIFICATE OF CORRECTION

PATENT NO.    : 6,099,986
DATED         : August 8, 2000
INVENTOR(S)   : Gauthier et al.

It is certified that error appears in the above-identified patent and that said Letters Patent is hereby corrected as shown below:

Column 1,
Lines 19 and 20, replace "electromechanical" with -- electro-mechanical --;

Column 9,
Line 23, replace "03856." with -- 0.3856 --;
Line 39, replace "03856." with -- 0.3856 --;
Line 54, replace "6" with -- δ --;

Signed and Sealed this

Tenth Day of December, 2002

JAMES E. ROGAN
*Director of the United States Patent and Trademark Office*